United States Patent [19]

Choi

[11] Patent Number: 4,885,705

[45] Date of Patent: Dec. 5, 1989

[54] EXPERT SYSTEM SHELL FOR BUILDING PHOTOFINISHING DIAGNOSTIC SYSTEMS

[75] Inventor: King F. Choi, Rochester, N.Y.

[73] Assignee: Eastman Kodak Company, Rochester, N.Y.

[21] Appl. No.: 160,475

[22] Filed: Feb. 25, 1988

[51] Int. Cl.[4] ........................ G06F 15/18; G01J 29/00

[52] U.S. Cl. .................................... 364/525; 364/526; 364/513; 354/321

[58] Field of Search ............... 364/525, 526, 523, 513, 364/469; 355/4, 5, 100, 105; 354/334, 321

[56] References Cited

U.S. PATENT DOCUMENTS

| | | | |
|---|---|---|---|
| 4,217,648 | 8/1980 | Thurm et al. | 364/526 |
| 4,310,235 | 1/1982 | Lorenzo et al. | 355/6 |
| 4,595,982 | 6/1986 | Burt | 364/300 |
| 4,611,918 | 9/1986 | Nishida et al. | 364/526 X |
| 4,628,435 | 12/1986 | Tashiro et al. | 364/130 |
| 4,642,782 | 2/1987 | Kemper et al. | 364/550 |
| 4,644,479 | 2/1987 | Kemper et al. | 364/550 |
| 4,646,252 | 2/1987 | Terashita | 364/525 |
| 4,648,044 | 3/1987 | Hardy et al. | 364/513 |
| 4,649,515 | 3/1987 | Thompson et al. | 364/900 |
| 4,653,014 | 3/1987 | Mikami et al. | 364/526 |
| 4,658,370 | 4/1987 | Erman et al. | 364/513 |
| 4,666,307 | 5/1987 | Matsumoto et al. | 356/404 |
| 4,693,589 | 9/1987 | Watanabe et al. | 355/5 |

OTHER PUBLICATIONS

Hayes-Roth, "The Knowledge-Based Expert System: A Tutorial," 9/84, *Computer,* IEEE, pp. 11-28.

Michaelsen, "The Technology of Expert Systems," 4/85, *BYTE,* pp. 303-312.

Moore, "Expert Systems: Are They the Next Generation of Process Controls?", 5/85, *In Tech,* pp. 55-57.

Hartzband, "Enhancing Knowledge Representation in Engineering Data Bases," IEEE, *Computer,* pp. 39-48.

*Primary Examiner*—Parshotam Lall

*Assistant Examiner*—Thomas G. Black

*Attorney, Agent, or Firm*—Dennis R. Arndt

[57] ABSTRACT

The present invention involves a computer-based expert system tool for making decisions regarding photofinishing processes. An expert mentor in the photofinishing area provides specific information both factual knowledge and judgmental knowledge including any judgmental rules he uses to make judgments and solve problems in the photofinishing area for a number of different processes. The expert then makes representative decisions using the computer which characterizes situations in terms of their data values based on information derived from a control strip used in the given photofinishing process. From this interaction the expert system tool of this invention is able to generate an internal representation of the logical processes of the expert and to characterize each situation in terms of a series of intermediate judgments. The expert system tool of this invention can determine the relative logical importance of each of the data points and to classify each as being of either major or minor significance.

4 Claims, 13 Drawing Sheets

| | D-max | | | | Color | | | | Speed | | | | D-min | | | |
|---|---|---|---|---|---|---|---|---|---|---|---|---|---|---|---|---|
| | red | green | blue | ave. | red | green | blue | ave. | red | green | blue | ave. | red | green | blue | ave. |
| | Rx | Gx | Bx | Ax | Rc | Gc | Bc | Ac | Rs | Gs | Bs | As | Rn | Gn | Bn | An |
| high D-max | | | | >0 | | | | | | | | | | | | |
| low green red D-max | <Ax | <Ax | >Ax | <0 | | | | | | | | | | | | |
| low blue D-max | >Ax | >Ax | <Ax | <0 | | | | | | | | | | | | |
| low red D-max | <Ax | >Ax | >Ax | <0 | | | | | | | | | | | | |
| low blue grenn D-max | >Ax | <Ax | <Ax | <0 | | | | | | | | | | | | |
| low green D-max | >Ax | <Ax | <Ax | <0 | | | | | | | | | | | | |
| blue color balance | | | | | >Ac | >Ac | <Ac | | | | | | | | | |
| yellow color balance | | | | | <Ac | <Ac | >Ac | | | | | | | | | |
| magenta color balance | | | | | <Ac | >Ac | <Ac | | <As | >As | <As | | | | | |
| green color balance | | | | | >Ac | <Ac | >Ac | | >As | <As | >As | | | | | |
| yellow cyan color balance | | | | | <Ac | <Ac | >Ac | | <As | >As | <As | | | | | |
| red color balance | | | | | <Ac | >Ac | >Ac | | <As | >As | >As | | | | | |
| cyan color balance | | | | | >Ac | <Ac | <Ac | | >As | <As | <As | | | | | |
| slow process | | | | | | | | >0 | | | | | | | | |
| fast process | | | | | | | | <0 | | | | | | | | |
| yellow neutral high D-min | | | | | | | | | | | | | <=An | <=An | >=An | >0 |
| high contrast | | | | | | | | | | | | <Ac | | | | |
| low contrast | | | | | | | | | | | | >Ac | | | | |

FIG. 6

| DIAGNOSIS / SYMPTOM | high D-max | low green red D-max | low blue D-max | low red D-max | low blue grenn D-max | low green D-max | blue color balance | yellow color balance | magenta color balance | green color balance | yellow cyan color balance | red color balance | cyan color balance | slow process | fast process | yellow neutral high D-min | high contrast | low contrast |
|---|---|---|---|---|---|---|---|---|---|---|---|---|---|---|---|---|---|---|
| C.D. too dilute | 60 | | | | | | | | 80 | | | | | | | | 30 | |
| C.D. temperature too low | | | | | | | | 1 | | | | | | | | | | |
| C.D. temperature too high | | | | | | | 1 | | | | | | | | | | | |
| C.D. starter too much part A | | | | | | | | 15 | | | | | | | | | | |
| C.D. starter added to F.D. | | | | | | | | | | | | | | | | | | |
| C.D. repl. too much part B | | | | | | | 10 | | | | | | | | | | | |
| C.D. repl. too much part A | | 50 | | | | | | | | | | | | | | | | |
| C.D. pH too low | | | 60 | | | | 70 | | | | | | 50 | | | | | |
| C.D. pH too high | | 40 | | | | | | 60 | | | | | | | | | | |
| C.D. oxidised | | | | 60 | | | 1 | | | | | | | 1 | | | | |
| C.D. over-replenished | | | | | | | | 15 | | | | | | | 5 | | | |
| C.D. overconcentrated | | | | | | 40 | | | | 50 | | | | | 5 | | | 30 |
| C.D. too much part B | | | | | | | | | | | | | | 1 | | | | |
| C.D. contamination | | | | | | | | 1 | | | | | | | | | | |
| C.D. contaminated with Fixer | | | | | | | | | | | 50 | | | | | | | |
| C.D. contaminated with F.D. | | 5 | | | | | | | | | 50 | | | | | | | |
| C.D. added to F.D. | | | | | | | | 5 | | | | | | | | | | |
| Bleach underaerated | | | | 80 | | | | | | | | 80 | | | | | | |

FIG. 7

EXPERT SYSTEM SHELL FOR BUILDING PHOTOFINISHING DIAGNOSTIC SYSTEMS

FIELD OF THE INVENTION

The present invention relates generally to artificial intelligence and knowledge engineering, and more particularly to a knowledge engineering tool for diagnosing a photofinishing process such as in a film processor.

BACKGROUND OF THE INVENTION

A portion of the disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

A photofinishing process is a procedure for converting a latent image on the photographic plate to an actual image. It has been known for a long time that some silver salts, such as silver bromide and silver iodide (collectively called silver halides), are sensitive to light. When silver halide is exposed to light, the structure of the silver halide will be changed. It was also noted that unexposed and exposed silver halides have different chemical characteristics. When a thin layer of silver halide emulsion is put on a plate which is later exposed to different light intensities, a latent image is formed on the plate. By placing the plate in a developer solution, the exposed silver halide is reduced to metallic silver, while the unexposed silver halide is not affected. The unexposed silver halide can then be dissolved and washed away in the subsequent steps, leaving the metallic silver behind. Because of the special molecular structure of the reduced metallic silver it actually appears in black rather than in "silver" color, resulting in a black-and-white picture.

Color processing is more complicated. Based on the tri-color theory (red, green and blue for the additive method or their corresponding complementary colors, cyan, magenta and yellow for the subtractive method), the whole color spectrum can be reproduced by using just three primary colors. In photography, the subtractive method is extensively used. Three layers of silver halide emulsion that contain (or are later caused to contain) dyes of cyan, magenta and yellow are made to become sensitive only to red, green and blue light, respectively. Thus, three overlapping images of cyan, magenta and yellow colors are formed, resulting in a color picture.

There are many different photofinishing processes in use today. For example, the pictures that we take using KODACOLOR TM films (or equivalent ones) are first processed using process C-41 to develop the color negatives. The color negatives are then used with a printer to produce latent images on Kodak EKTACOLOR TM paper (or equivalent paper) which are then developed using process EP-2 to produce the color prints.

Color slides such as Kodak EKTACHROME TM films are developed using process E-6. Process E-6 is a reversal process which first develops the exposed film using a black-and-white developer. The film is then re-exposed and developed using a color developer, resulting in a positive image. Process K-14 is used for developing color slides on KODACHROME TM film. It includes a black-and-white developer followed by re-exposures and three color developers (one for each subtractive primary color) to form a positive image. It is by far the most complex photofinishing process.

Photofinishing is a chemical process that can be characterized by a set of variables, or the chemical and physical parameters. A real-time direct control of the chemical process could be implemented, if thorough feedback, information as to all of the state variables could be obtained at any time. Physical parameters, such as temperature of solution, the amount of time the film is in a solution, the replenishment rate of the solution, etc. can be measured on a timely basis. However, chemical parameters, such as the composition and concentration of chemicals in a processing solution, are very difficult to measure instantaneously and precisely. It seems that real-time direct control of photofinishing processes is beyond the technology available today. Since photofinishing processes are dynamic in nature, the controlling parameters may drift with time with various degrees of severity. Control is further complicated by human factors such as mixing the chemicals, setting the temperatures, etc. A process that once produced excellent pictures may produce pictures that are no longer acceptable. Thus, some way to keep a photofinishing process in control is necessary and this is usually done by human experts through examining the pictures produced. To do this objectively, a filmstrip (commonly known as a control strip 10) that is pre-exposed to different intensities of light under controlled conditions is processed with a customer's work to determine the status of the process. FIG. 1 illustrates a typical control strip 10 for Process E-6. At the top of this control strip, there are three color patches (yellow 12, magenta 14, and cyan 16) which are pre-exposed only to blue, green and red light respectively. These patches provide an easy-eye examination of the quality of the individual color. In the middle of the strip is the "gray" scale; it is a series of patches exposed to increasing intensities of white light. Based on these patches, characteristic curves such as the one in FIG. 2 can be drawn. Usually, characteristic curves are characterized by four points corresponding to four levels (steps) of exposure on the control strip 10. They are the minimum density step (D-MIN), low density step (LD or speed step), high density (HD or color step) and maximum density step (D-MAX). The red, green and blue densities at these exposure levels are read using a densitometer (not shown) and are compared against reference values. The deviations from the reference values are then plotted to monitor the status of the process. FIG. 3 shows typical deviation plots on a color process record form. In this figure, there are a number of solid lines and dotted-line pairs running across the form. The solid lines 28 indicate the aims of the parameters. The closer the plots are to the aims, the better the pictures. For each pair of dotted lines 30, the one that is closer to the aim defnes the action limit. When a parameter moves beyond the action limit, this implies that the process is beginning to get out-of-control and action should be taken to bring the parameter back. The dotted line 30 that is further away from the aim defines the control limit. When a parameter goes outside the control limit, the process is totally out-of-control and processing should be stopped, or unsatisfactory pictures will result.

Using FIG. 3 as an example, when the green speed step 32, plotted on this chart, moved above the action limit at 12:20 on Sept. 5, it was discovered that the underlying cause of the problem was that the first developer temperature was too low. Corrective action was taken to adjust the first developer temperature and the process was brought back under control.

This process of determining the underlying cause or causes is known as photofinishing process diagnosis. To assist processing experts (or novices) in diagnosing process control problems, many control plots are documented showing how each chemical or physical parameter affects the color densities at various exposure levels. FIG. 4 is an example of such control plots and shows the effect of color developer over replenishment.

Since there are many physical and chemical parameters, and each control plot only shows the effect of a single parameter, the control plots are only helpful in a limited way to determine the possible cause (or causes) when, in real life, control problems usually have multiple causes. Over the years, a processing expert develops a set of hunches which are not documented in any way to solve processing control problems. However, these experts are hard to come by and many of them will sooner or later retire and/or leave and take with them their trouble-shooting expertise.

Therefore, it appears helpful to have a computer-aided diagnostic system based on current expert system technology to preserve the process diagnostic expertise and to aid personnel who are involved in photofinishing process diagnosis. Ultimately, such a tool can be made available to people not having any direct involvement or engineering knowledge and no specific knowledge of the underlying expert system technology.

In most areas of artificial intelligence, that branch of computer science which attempts to have machines simulate intelligent behavior, programs fall far short of the competence of humans or even animals. Computer systems designed to see images, hear sounds, and recognize speech are still in fairly early stages of development. However, in one area, that of reasoning or knowledge in a limited domain, computer programs cannot only approach human performance but in some cases they can exceed it.

These programs use a collection of facts, rules of thumb, and other knowledge about a given field, coupled with methods of applying those rules, to make inferences. They solve problems in such specialized fields as medical diagnosis, mineral exploration, and oil well log interpretation. They differ substantially from conventional computer programs because their applications are heuristic rather than algorithmic in nature.

Knowledge systems are computer systems that emulate reasoning tasks by using an "inference engine" to interpret machine readable knowledge stored in a "knowledge base". Knowledge systems are becoming useful for problems that require diagnosis, recommendation, selection or classification. Such tasks have in the past been performed by human experts. It is becoming known that if the domain of the knowledge base, or scope of the problem, is sufficiently narrow and a sufficiently large body of knowledge is properly encoded in the knowledge base, then the knowledge system can achieve performance matching or even exceed the ability of the human expert. In such a case, the knowledge system becomes an "expert system".

There are many expert system-building tools in use today to build expert systems. These tools range from special purpose ones, which are designed mainly for some particular applications, to general purpose ones, which contain a multitude of knowledge representation structures. Many of these tools were developed in universities and research institutes as research tools and have remained as such while some became commercially available, or were developed solely for commercial purposes.

Of the systems in use, there are four general categories, which are rule-based tools, inductive tools, domain specific tools, and hybrid tools. Rule-based tools and domain specific tools are more applicable to the problems and systems developed herein. Domain specific tools are designed specifically to develop expert systems for a particular domain. Therefore, these tools are most effective for the intended domain, but may not be suitable for others. IN-ATE TM (trademark of Automated Reasoning, Corp.) is an example of such a tool that learns as it is used. Such an expert system environment is specifically designed for fault diagnosis type of problems; that is, that the program remembers what has failed and automatically readjusts the reliability database and the rules accordingly. It is precisely this learning feature that does not lend itself to such tasks as photofinishing diagnosing of such things as a film processor where many rolls of film may be lost or damaged during the learning cycle.

The present invention uses a rule-based tool as the basic knowledge representation technique, which uses IF-THEN rules. Two types of control strategies are available, namely, forward chaining and backward chaining. Forward chaining strategy starts from the data and works to the conclusion, whereas backward chaining strategy starts from the stated goal and finds the plausibility of the goal by examining the conditions of the goal.

OPS5 is an example of a forward chaining rule base that is a rule-based expert system tool. It was developed at Carnegie-Mellon University as part of the OPS family of languages for expert systems and cognitive psychology. It is characterized by having a global database and condition-action rules programmed in the form of productions which operate on the global database.

The basic (and only) data structure in the global database is called "class", which is equivalent to the idea of a record in procedural languages. Each class has a class name and consists of a number of fields called attributes. An attribute may be either scalar, which contains one atom, or a vector, which contains a list of atoms. There are three types of atoms: symbols, integers, and floating-type numbers. One restriction about class definition is that there may be at most one vector attribute per class. Instances of classes are called elements. Elements can be created, modified, or destroyed through actions which are the basic components of the right-hand side of production rules.

Production rules in OPS5 employ forward chaining strategy. The left-hand side of a production rule describes the conditions under which the rule may be activated. The conditions here refer to the current state of the database. The right-hand side of a production rule describes the actions to be taken when the rule is activated. In general, the actions will affect the current state of the database and thus which rule is to be activated next. The rules can be regarded as independent, parallel processes constantly monitoring the current state of the database and waiting for the conditions necessary for them to become activated. Only one rule may be activated at a given time. When the conditions are met for more than one rule, a conflict is said to occur. OPS5 resolves the conflicts by preferring the rule with more stringent conditions and/or conditions that match elements which are most recently created or modified. (Therefore, each element carries with it a time-stamp, indicating the time it was created or last modified.) After the preferred rule is fired, the state of the database may be changed and all rules have to re-check their conditions again for firing. This is known as the recognized-act cycles in OPS5.

SUMMARY OF THE INVENTION

In accordance with the invention, an expert system is provided for use by an expert system user in conjunction with the control of a given photofinishing process comprising a computer having a stored program and memory for storing a knowledge base relation to one or more photofinishing processes. A control strip is used in the photofinishing process to supply densitometric information. The knowledge base includes both factual and judgmental knowledge concerning the photofinishing processes with the judgmental knowledge including judgmental rules. The factual knowledge used includes definitions of densitometric parameters associated with a given photofinishing process. The judgmental rules in the knowledge base include rules having premises referring to causes for out of tolerance densitometric parameters and rules for concluding which parameters were out of tolerance. Built-in control procedures are then executed which can interpret the knowledge base for a specific photofinishing process to determine possible causes for the out of tolerance parameters. Chaining rules associated with a specific photofinishing process are invoked. Means are also provided for terminating the knowledge base search for an unknown value. The judgmental knowledge advice from experts is used to generate attenuation factors associated with all possible causes for the out of tolerance parameter. Where possible cause descriptions may be generated from more than one cause for a given out of tolerance parameter, they will then be merged. A modification factor is then formed, based on possible causes and deviations from a normal range is derived from additional data received from a request for more data. A list of possible causes is then generated along with certainty factors associated with each of the causes listed.

BRIEF DESCRIPTION OF THE DRAWINGS

Other objects and advantages of the invention will become apparent upon reading the following detailed description and reference to the drawings in which:

FIG. 6 is a partial list of possible symptoms and their conditions for a film process;

FIG. 7 is a partial list of attenuation factors relating to the symptoms and the possible causes for a film process;

DETAILED DESCRIPTION OF THE INVENTION

Diagnosis Criteria

Figure 1:
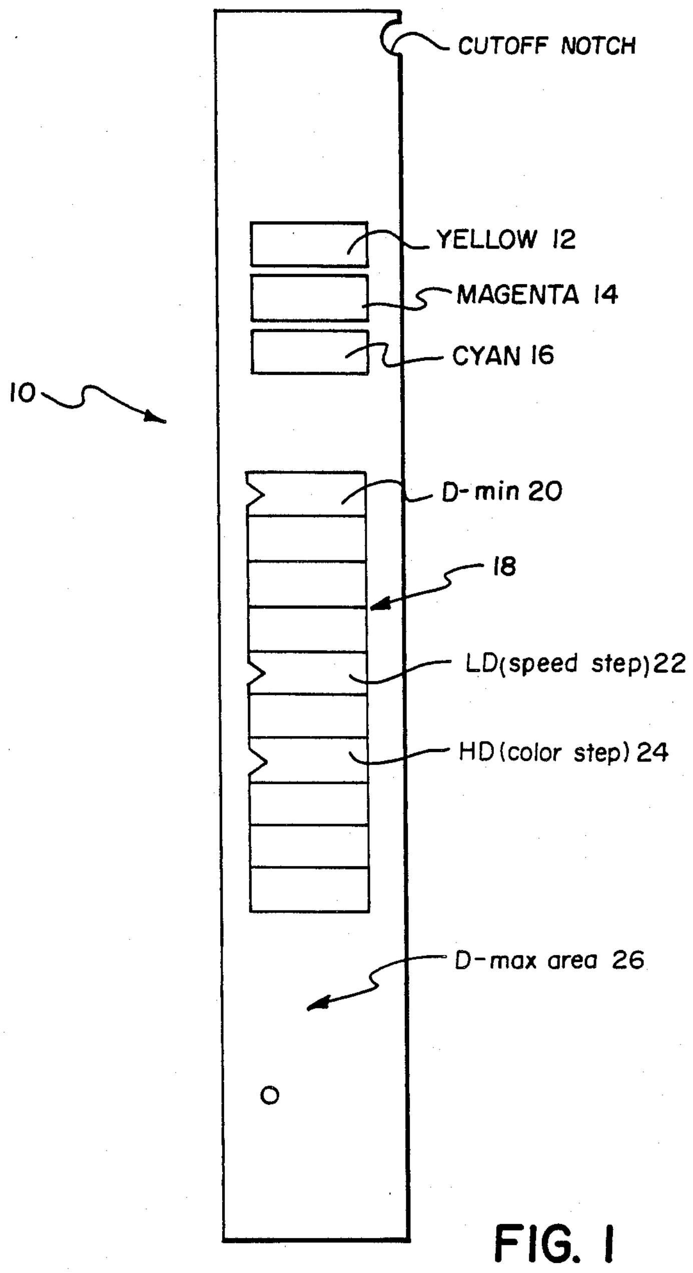
FIG. 1 illustrates a typical control strip of the type used in a photofinishing process.
Figure 2:
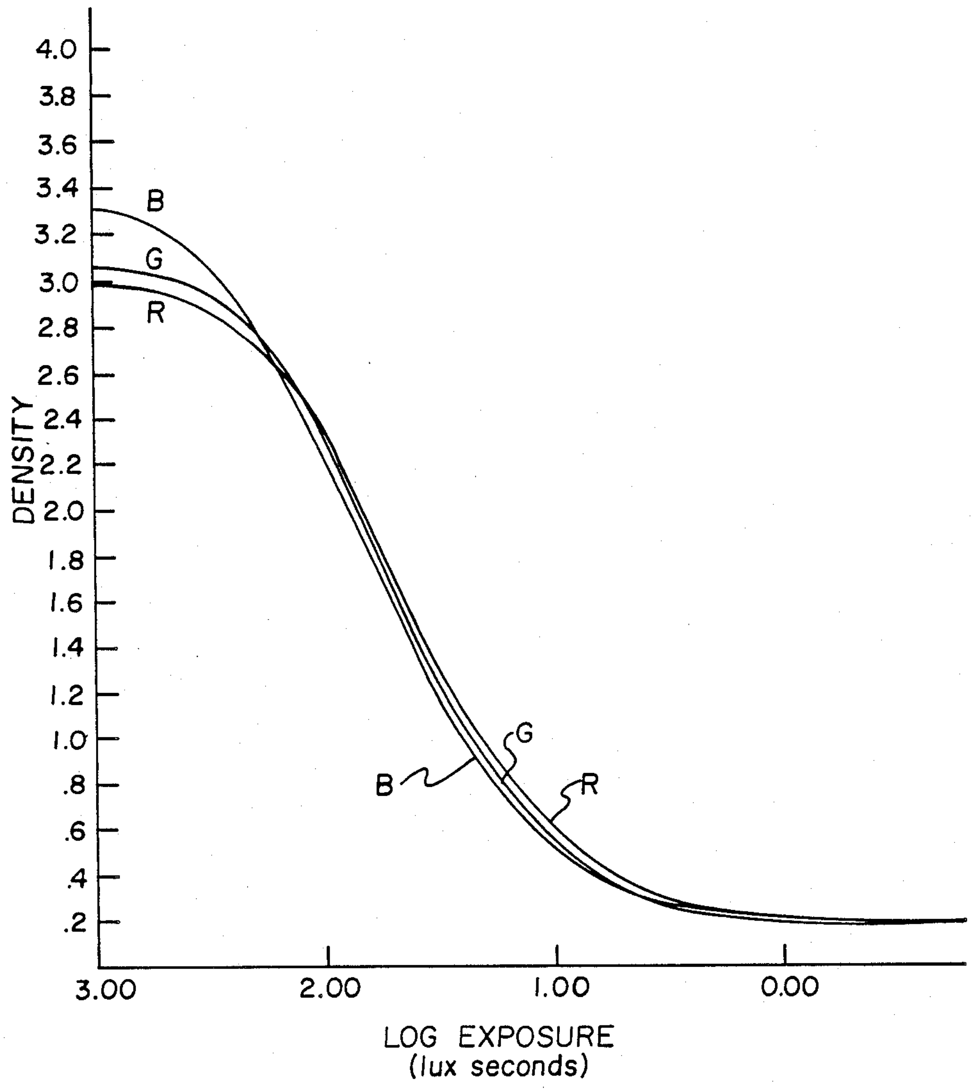
FIG. 2 is a graph of characteristic curves for film using red, green and blue densities.
Figure 3:
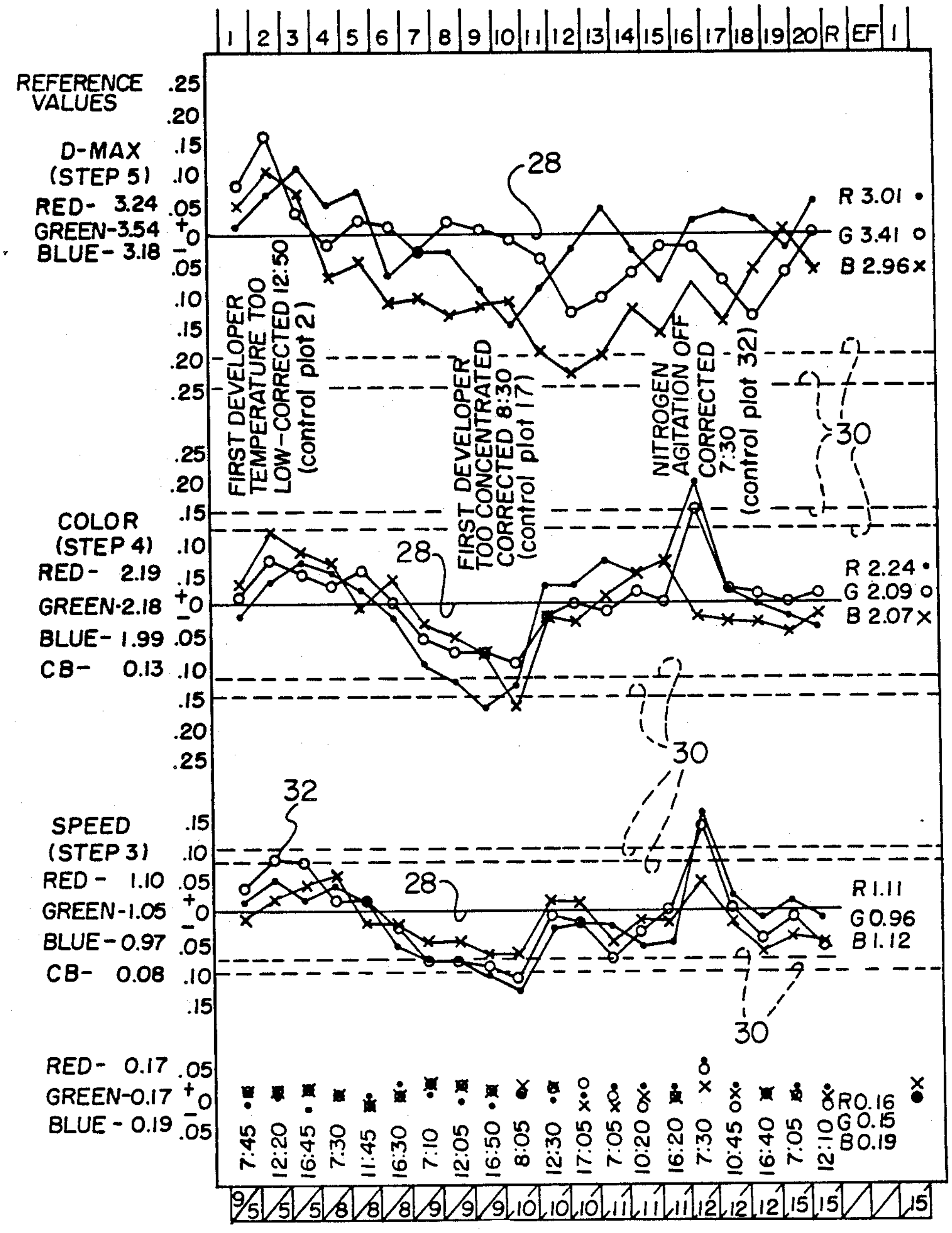
FIG. 3 shows a typical deviation plot which make any deviations from the reference values easy to identify.
Figure 4:
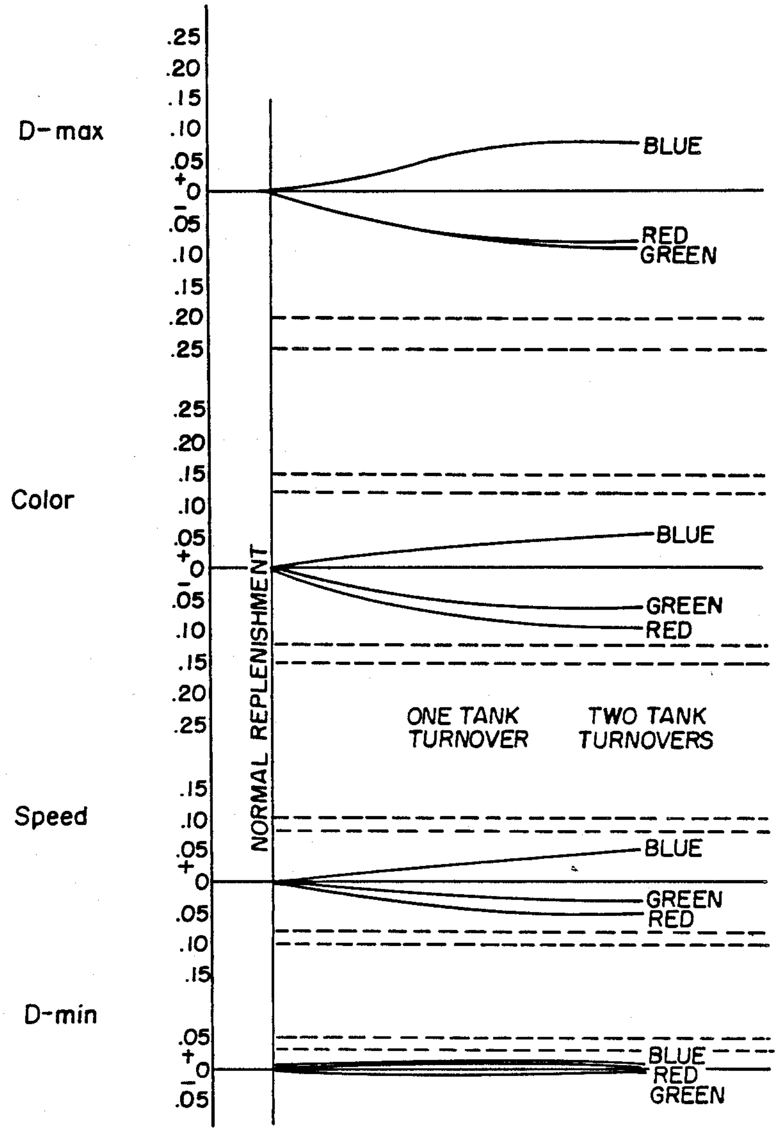
FIG. 4 is a graph illustrating densitometric effects of color developer overreplenishment.

Referring to FIG. 1, for the control of a photofinishing process, control filmstrips 10 which are pre-exposed under controlled conditions are processed with the customer's work. After a control strip 10 is processed, a densitometer (not shown) is used to read the red, green and blue densities of various exposure levels to determine the quality status of the process. The densitometric readings of the control strip 10 are then compared against the reference readings to measure the deviations of each color at each density step. When one or more of the deviations are beyond the action limits defined for the process, corrective actions will be taken to bring the process back under control.

To identify the underlying process control problem, process diagnosis experts generally analyze the control strip deviations available to describe the symptoms of the process. The customers' work is examined to verify the symptoms suggested by the control strip 10 that are indeed present in the photofinishing results. Process diagnosis experts also have accumulated knowledge about the possible causes for each symptom and the likelihood of each cause, and they use that knowledge to diagnose the process control problem. Process E-6, which is a reversal process (that is, positive rather than negative images are produced), will be used to exemplify the diagnostic system.

Figure 5:
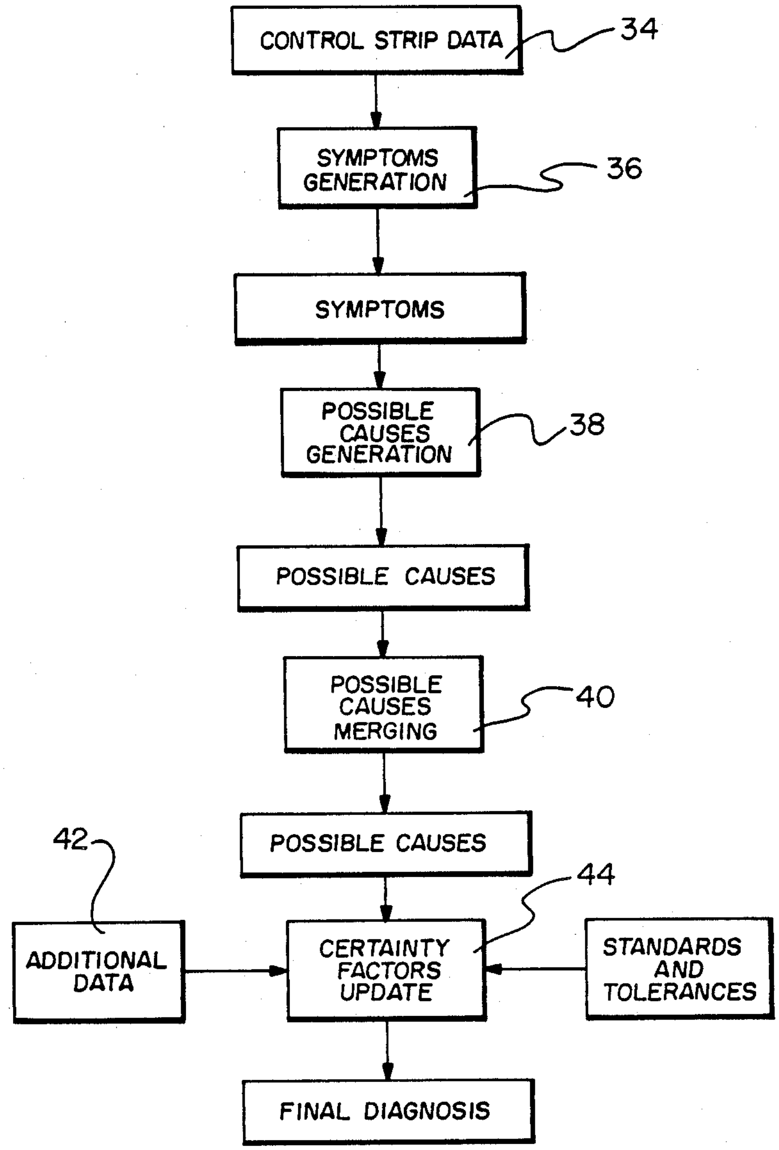
FIG. 5 shows the logic structure of the diagnostic system for a film process.

FIG. 5 illustrates the logic structure of the Process E-6 diagnostic system. It uses an evidential approach to diagnosis. It starts from the control strip deviation readings and ends in suggesting the possible causes and their certainty factors through the following six phases:

1. symptoms generation 36;
2. possible causes generation 38;
3. possible causes merging 40;
4. additional data gathering 42; and
5. certainty factors update 44.

The first three phases constitute the hypothesis generation and ordering. The last three phases correspond to the relevant evidential considerations determination in hypothesis evaluation and acceptance.

The control strip for Process E-6 contains 12 densitometric readings, which are the four exposure levels for each of the three colors red, green and blue. The four steps are generally known as the maximum density (D-MAX) step, the high density (color) step, the low density (speed) step and the minimum density (D-MIN) step. These densitometric readings are then compared against the reference readings to find the deviation of each reading. Each deviation is actually a two-digit decimal number less than one. However, the common practice for describing a deviation reading is to read it as a two-digit number without the decimal point. This practice is adopted in the disclosed system.

The diagnostic program also defines and calculates some derived parameters, which are functions of the control strip parameters. The purpose of having these derived parameters is to provide a better description of the status of the process and a convenient way to describe the symptoms.

FIG. 6 is a partial list of the possible symptoms and their conditions. For example, if the average D-max is less than zero, the blue D-max is less than the average D-max, and both the red D-max and the green D-max are greater than the average D-max, one may then conclude that one of the symptoms of this process is a low blue D-max.

In order to describe the severity of the symptom, a certainty factor is assigned to each symptom. The range of a certainty factor is between zero and one, inclusively. This factor is a function of how much the underlying parameters deviate from the aim—the greater the deviation, the higher the certainty. After all the possible symptoms and their corresponding certainty factors are generated, the Process E-6 diagnostic system generates all the possible causes of the symptoms. Each possible cause is associated with a certainty factor. The certainty factor of possible cause depends upon the certainty factor of the deriving symptom and attenuation factor.. The values of the attenuation factors are supplied by Process E-6 trouble shooting experts.

FIG. 7 illustrates a partial list of the possible symptoms, the underlying possible causes and the corresponding attenuation factors. For example in the course of diagnosing a control problem, the system deduces from the densitometric deviations that there is a low green red D-max symptom in the process with a certainty factor of 60%. Looking up the attenuation factor for low green red D-max, there are three entries in this partial list. The possible causes that are generated are Color Developer contaminated with the first developer with a certainty factor of 3% (60%×5%), color developer pH too high with a certainty factor of 24%, and color developer too much part A with a certainty factor of 30%.

When all the possible causs based on the symptoms are generated, there might be possible causes with the same cause description generated from two or more different symptoms. This implies that the possible cause should be more likely. When such is the case, the possible causes merging phase 40 combines the possible causes with the same cause description together and calculates a new certainty factor for the possible cause using the following certainty propogation formula: CF=CF1+CF2−CF1*CF2.

The properties of this formula are:
1. The new CF ranges between 0 and 1, inclusively.
2. The new CF is a mono-increasing function of CF2 given a fixed CF1, and vice versa.
3. The new CF is greater than both CF1 and CF2.
4. When there are more than two possible causes, with the same cause description to be merged, the ordering of the merge is irrelevant.

Figure 8:
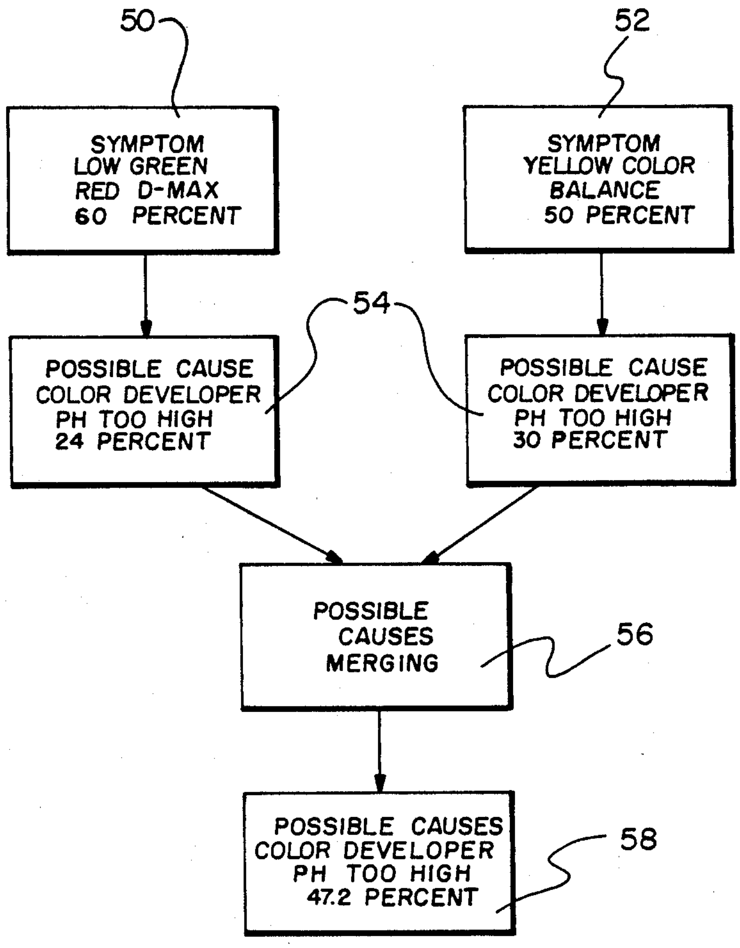
FIG. 8 is an example using a diagrammatic representation to illustrate possible causes merging.

FIG. 8 illustrates an example of possible causes merging. In this example, there is low green, red D-max symptom 50 with certainty factor of 60% and yellow color balance symptom 52 with certainty factor of 50%. One of the possible causes derived from low green, red D-max symptoms 50 is color developer pH too high with a certainty of 24%. The same possible cause 54 is derived from yellow color balance symptom with a certainty of 30%. In merging the two possible causes 56 together, we conclude as a possible cause 58 that the developer pH is too high and has a new certainty factor of 47.2% (0.24+0.30−0.24*0.30).

When the generated possible causes can be confirmed or disconfirmed with additional data, the system will prompt the user to provide them. Upon the request of the system to provide additional data, the user can respond with any of the following:
1. Measure and enter the additional data.
2. Question why the additional data are relevant to the diagnosis.
3. Enter "N/A" to indicate that the data is not available.
4. Stop the additional data gathering session.

During an additional data gathering session, the system may prompt the user to enter for example, color developer specific gravity. When the user would question "why" this data is needed, the system would respond with the underlying symptom and the possible cause for the symptom. The user may then enter the measurement for the color developer's specific gravity as 0.040. Subsequently, the user may enter 0.034 for the first developer's specific gravity, "N/A" for color developer replenishment rate, and stop the additional data gathering when the first developer replenishment rate was requested. The user can also re-examine the values of the additional data entered and modify the data if necessary. The additional data that are relevant to the diagnosis are flagged so that the user can take note and enter them later on.

When relevant additional data are available, the system will derive modification factors to adjust the certainty factors of the possible causes generated. The range of the modification factors is between −1 for strongly disconfirming evidence, and 1 for strongly confirming evidence, inclusively.

Given a possible cause with a certain relevant additional data, the modification factor MF is a function of the value of the additional data V, the standard value of the additional value asked, the tolerance of the additional data T, and the direction of the confirming evidence D. The modification factor is derived using the following algorithm:

1. If D is high and V≧S+2*T, then MF=1.
2. If D is high and S<V<S+2*T, then MF=(V−S−T)/T.
3. If D is high and V≦S, then MF=−1.
4. If D is low and V≦S−2*T, then MF=1.
5. If D is low and S>V>S−2*T, then MF=(S−T−V)/T.
6. If D iw low and V≧S, the MF=−1.

The properties of the above algorithm are:
1. MF is between −1 and 1, inclusively.
2. MF is a continuous monotonic function of V.
3. If V is opposite to the confirming evidence direction, MF=−1.
4. If V is within the tolerance, MF is negative (disconfirming).
5. If V is beyond the tolerance in the confirming evidence direction, MF is positive (confirming).

Once the modification factors are derived, the new certainty factors can be calculated using the following algorithm:
1. If 0≦MF≦1, then CF=CF+MF−CF*MF.
2. If −1<MF<0, then CF=(CF+MF)/(1+MF).
3. IF MF=−1, then CF=−1.

The properties of the above algorithm are:
1. CF is between −1 and 1, inclusively.
2. The new CF is a continuous monotonic function of MF and the old CF.

3. CF remains unchanged when MF is zero.

Figure 9:
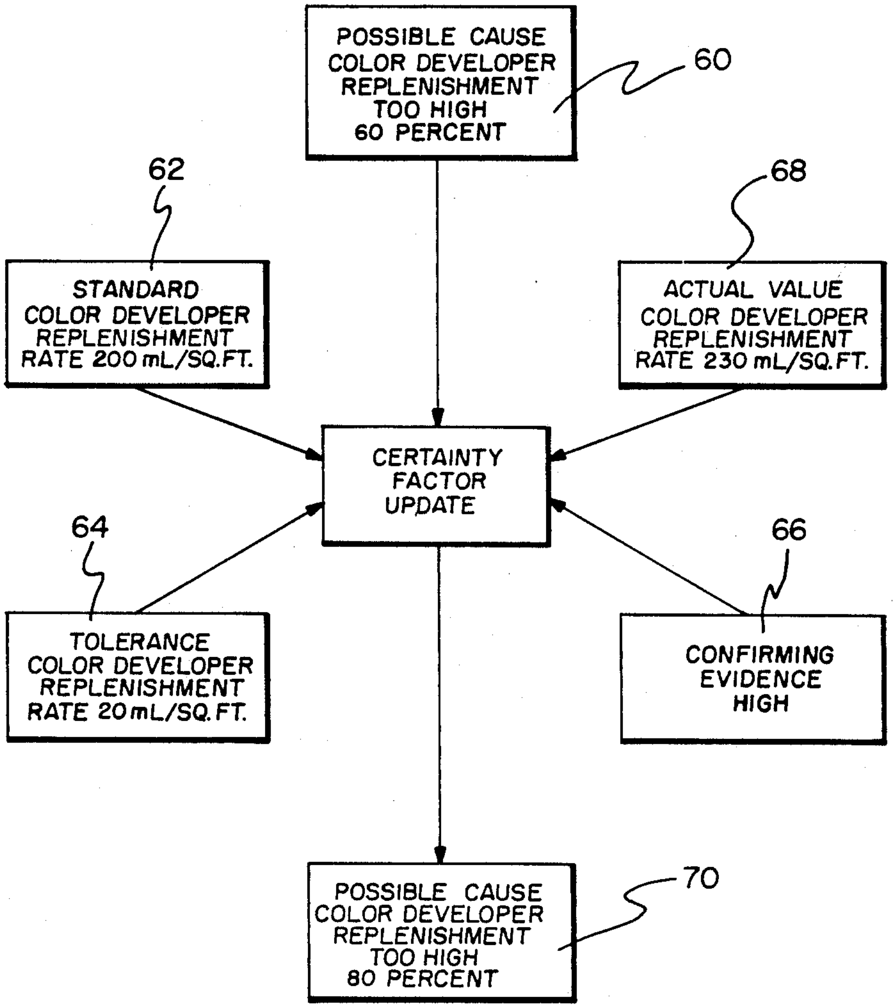
FIG. 9 is an example using a diagrammatic representation for certainty factor update.

FIG. 9 illustrates an example of a certainty factor update. In this example, the certainty factor of the possible cause of the color developer replenishment being too high is 60%. The standard replenishment rate 62 is 200 ml per square foot. The tolerance 64 is 20 ml per square foot. The direction of confirming evidence 66 is high. Given that the actual value 68 of the color developer replenishment rate is 230 ml per square foot, the modification factor is 50% ((230−200−20)/20). The new possible cause (certainty factor) 70 is thus 80% (0.60+0.50−0.60*0.50). Possible causes for which there is no relevant additional data or whose relevant additional data are not available will have their certainty factors unmodified.

After all the certainty factors of the possible causes have been updated, the system prompts the user to enter the cutoff percentage of certainty factor. Possible causes with certainty factors greater than the user's input cutoff, are displayed to the user in descending order of certainty factors.

EXPERT SYSTEM TOOL

Figure 10:
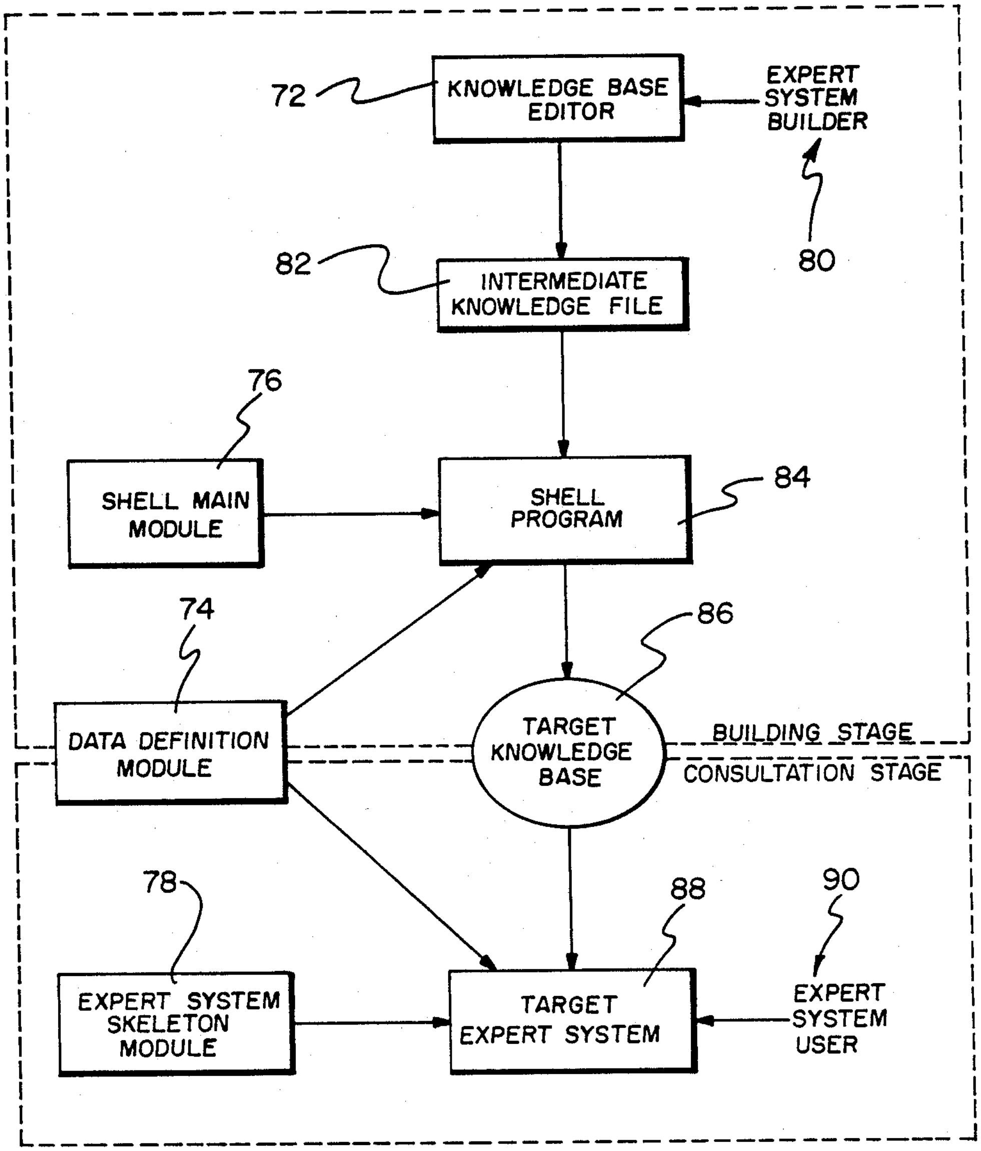
FIG. 10 illustrates the structure of the expert system tool and how the components relate to each other.

FIG. 10 illustrates the structure of the expert system tool and how the components relate to each other. This tool consists of four main components, namely, the Knowledge Base Editor 72, the Data Definition Module 74, the Shell Main Module 76 and the Expert Systems Skeleton Module 78.

In general, Knowledge Base Editor 72 interacts with the Expert System Builder 80 to produce the Intermediate Knowledge File 82. Intermediate Knowledge File 82 contains expert knowledge provided by Expert System Builder 80 (through Knowledge Base Editor 72). This knowledge is in an intermediate formate which can be interpreted by a Shell Program 84 to produce Target Knowledge Base 86.

Shell Program 84 consists of two modules: Shell Main Module 76 and Data Definition Module 74, which primarily is used to interpret Intermediate Knowledge File 82. Shell Main Module 76 contains procedural knowledge (production rules) for interpreting Intermediate Knowledge File 82.

Data Definition Module 74 contains structural knowledge (frame definitions) for generating frame instances in Target Knowledge Base 86 (not yet discussed). A list of frame definitions for Data Definition Module 74 can be found below in the detailed discussion of this module.

Target Knowledge Base 86 contains frame instances required by Expert System Builder 80 as well as desired parameter generation rules, symptom generation rules and possible cause generation rules.

Target Expert System 88 interacts with the Expert System User 90 to require the required data for the diagnosis and the final diagnosis with explanations. It consists of three modules: Data Definition Module 74, Expert System Skeleton Module 78 (not yet discussed), and Target Knowledge Base 86. These three modules are merged together to form Target Expert System 88.

Expert System Skeleton Module 78 contains structural knowledge which utilizes Target Knowledge Base 86 to request data from as well as provide diagnosis and explanations to Expert System User 90.

The Knowledge Base Editor 72, Intermediate Knowledge File 82, Shell Main Module 76, Data Definition Module 74 and Expert System Skeleton Module 78 will all be discussed in greater detail below to provide a better understanding of the system. However, all of these elements could be combined into what is commonly known as a "Knowledge Base".

INTERMEDIATE KNOWLEDGE FILE

Intermediate Knowledge File 82 is the first to be created. Intermediate Knowledge File 82 is in some particular syntactic format reflecting the underlying implementation language used. Because of this, assistance to the Expert System Builder 80 is provided through the use of Knowledge Base Editor 72. This Knowledge Base Editor 72 interfaces with the user 90 in a "friendly" way producing the desired Intermediate Knowledge File 82.

Intermediate Knowledge File 82 serves as an input to Shell Program 84 to create Target Knowledge Base 86. Shell Program 84 can be divided into two modules, namely Data Definition Module 74 and Shell Main Module 76. Data Definition Module 74 contains data structures that are common to the expert system building stage as well as the target system consultation stage. Shell Main Module 76 contains routines that use the data structures defined in Data Definition Module 74 to convert Intermediate Knowledge File 82 to a Target Knowledge Base 86. Target Knowledge Base 86 and Data Definition Module 74 are then combined with Expert System Skeleton Module 78 to form Target Expert System 88.

KNOWLEDGE BASE EDITOR

The purpose of Knowledge Base Editor 72 is to provide a user interface and to create and modify Target Knowledge Base 86 of Target Expert System 88. It shields Expert System Builder 80 from the internal design of the knowledge structure and the language(s) used to implement Target Knowledge Base 86. The minimal functionalities of Knowledge Base Editor 72 are as follows:

1. Add new instances to the pre-defined frames.
2. Delete instances of the pre-defined frames.
3. Modify instances of the pre-defined frames.
4. List instances of the pre-defined frame.
5. Provide help facilities to guide expert system builders when necessary.
6. Update the knowledge base at the end of the editing session.
7. Terminate an editing session without updating.

In summary, the output of Knowledge Base Editor 72 is Intermediate Knowledge File 82 which is used as an input to Shell Program 86 to produce Target Knowledge Base 86 of Target Expert System 88. The listing below shows the commands that are available and how the editor may be invoked.

```
run kbe
Enter Process Name (1-8) characters: e6
KBE > help
type a <frame_type> to add frame
type d <frame_type> <frame_no> to delete frame
type h for help
type l <frame_type> [<frame_no>] to list frame(s)
type m <frame_type> <frame_no> to modify frame
type q to quit (without update)
type x to exit (with updated
possible choice of <frame_type> are:
csp — control strip parameter
ddp — derived parameter
add — additional data
csd — cause & solution description
ccp — conflicting cause pair
```

-continued

```
sym — symptom description
KBE>
```

Figure 11:
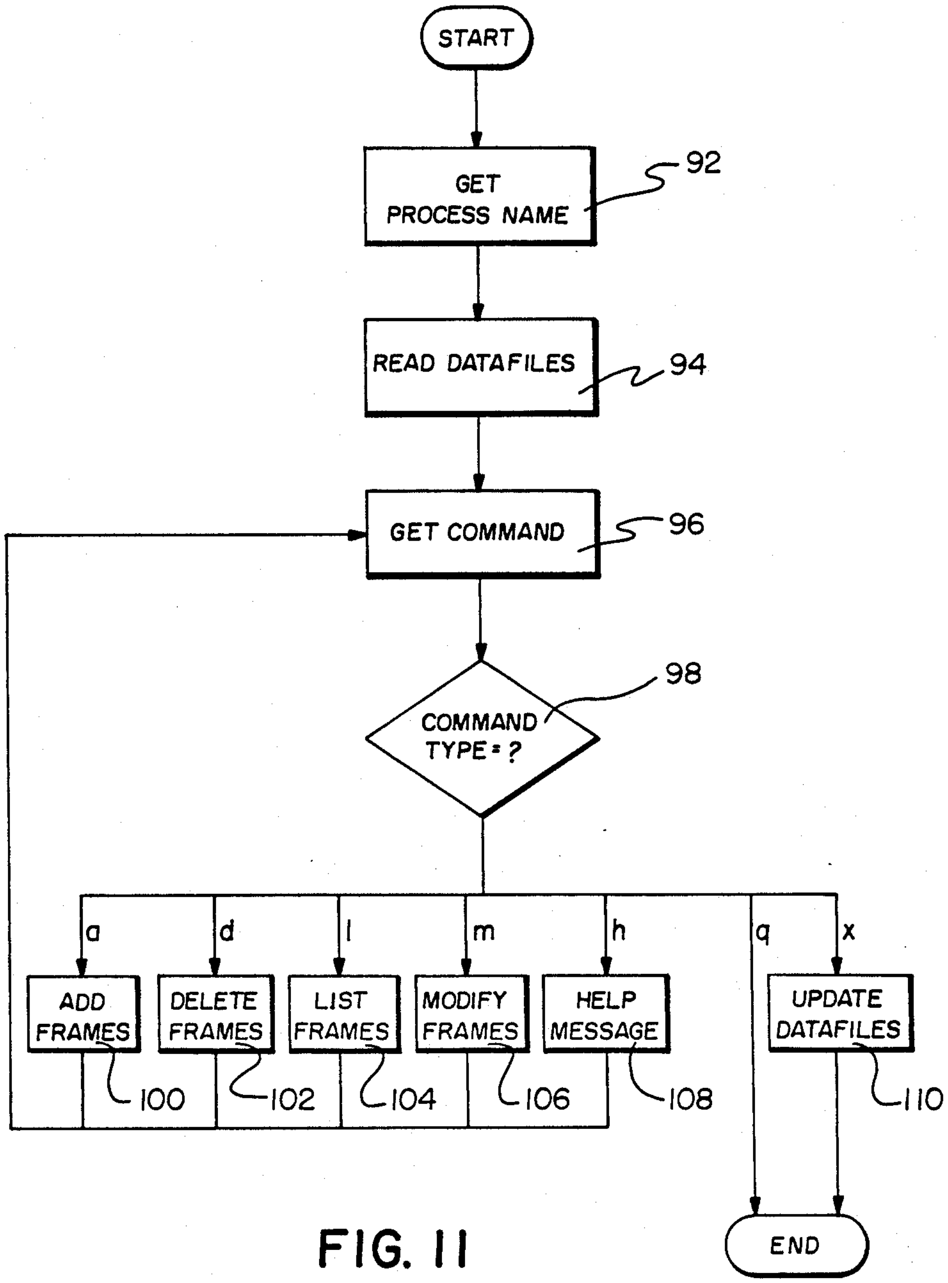
FIG. 11 is a flowchart for the Knowledge Base Editor.

FIG. 11 illustrates the flow chart for Knowledge Base Editor 72, wherein instruction 92 identifies the name of the intended system. This is necessary because Knowledge Base Editor 72 allows Expert System Builder 80 to incorporate more than photofinishing process diagnostics systems. After the process name is identified, instruction 94 retrieves and reads in all the data files that are relevant to the process. There are six data files corresponding to the six types of frames: control strip parameter frames, derived parameter frames, additional data frames, cause & solution frames, conflicting cause pair frames, and symptom description frames. In the event any of the data files do not exist, this step will create the missing data files.

The "get command" instruction 96 prompts Expert System Builder 80 to enter an appropriate command. Instruction 98 interprets the command entered and passes control to the respective command handlers. Valid commands are "a" for adding frames, "d" for deleting frames, "1" for listing frames, "m" for modifying frames, "h" for displacing the help message, "q38 for quitting the editor without updating the changes made and "x" for exiting the editor and updating the changes made. Instruction 100 checks the frame type in the command entered and allows the expert system builder to add new frame instance definitions of the specified frame type. Frame type and the frame number are checked in instruction 96 for the command entered and the specified frame instances definition are delected by instruction 102.

Instruction 104 "list frames" checks the frame type and the frame numbers in the command entered and lists the specified frame instance definitions. Similarly, instruction 106 "modify frame" checks the frame type and the frame number in the command entered and allows the user to modify the specified frame instance definition.

Instruction 108 the "help message", displays the valid commands and syntax for Expert System Builder 80 to interact with Knowledge Base Editor 72. Instruction 110 updates all the six data files according to the changes made by Expert System Builder 80. This instruction also generates a new Intermediate Knowledge File 82 to be used by Shell Program 84. The actual software used in Knowledge Base Editor 72 is listed in Appendex A at the end of the Specification.

DATA DEFINITION MODULE

The Data Definition Module 74 contains all the common data structure definitions for building Shell Program 84 as well as Target Expert System 88. It includes a number of data definitions to represent the following frames:

1. [Control strip parameter frame.]
   (a) name slot
   (b) deviation value slot
2. [Derived parameter frame.]
   (a) name slot
   (b) deriving formula slot
   (c) value slot
3. [Additional data frame.]
   (a) name slot
   (b) standard value slot -continued (c) tolerance limit slot
   (d) value slot
4. [Symptom description frame].
   (a) name slot
   (b) (variable number of) condition slots
   (c) (variable number of) possible cause slots
5. [Cause-solution description frame].
   (a) name slot
   (b) relevant additional data slot
   (c) confirming evidence slot
   (d) solution slot
6. [Conflicting cause-pair frame.]
   (a) name of possible cause slot 1
   (b) name of possible cause slot 2

[CONTROL STRIP PARAMETER FRAME]

Because the photofinishing process monitoring and diagnosis start from the data on the control strip 10, control strip parameter frames are required to represent this data. A control strip parameter frame consists of the following slots:

1. The control strip parameter name slot.
2. The deviation value slot.

The control strip parameter name slot identifies the name of that control strip parameter. This value is to be entered during the target experiment building stage. The deviation value slot contains the densitometric deviation of that parameter from the aim or reference value. It is also to be entered by an end user of the target system during the consultation stage.

The following list contains the twelve control strip parameter frame instances used in Knowledge Base Editor 72. (Note that only the name slots are listed since the values of the deviation value slots are not yet known)

```
KBE> 1 csp
csp 1: red_D-max
csp 2: green_D-max
csp 3: blue_D-max
csp 4: red_Color
csp 5: green_Color
csp 6: blue_Color
csp 7: red_Speed
csp 8: green_Speed
csp 9: blue_Speed
csp 10: red_D-min
csp 11: green_D-min
csp 12: blue_D-min
KBE>
```

[THE DERIVED PARAMETER FRAME]

The derived parameter name slot identifies the name of that derived parameter. Its value is to be entered during the target expert system building stage. The following slots are contained in each frame of the derived parameter frames.

1. The derived parameter name slot.
2. The derived formula slot.
3. The parameter value slot.

The derived formula slot describes how the value is to be calculated. The format of this formula is like a typical arithmetic expression relating to the control strip parameter or other derived parameter. Information will be entered in this slot during the target expert system building Stage. The parameter value slot contains the actual value of that derived parameter. It is also to be provided by Target Expert System 88 during the building stage.

The following is a list of four derived parameter frame instances using the Knowledge Base Editor.

```
KBE> l ddp
ddp 1:
name: ave__D-max
formula: (red__D-max + green__D-max + blue D-max ) / 3
ddp 2:
name: ave__Color
formula: (red__Color + green__Color + blue Color) / 3
ddp 3:
name: ave__Speed
formula: ( red__speed + green__Speed + blue Speed ) / 3
ddp 4:
name: ave__D-min
formula: ( red__D-min + green__D-min + blue D-min ) / 3
KBE>
```

Taking the first frame instance as an example, the nameslot has a value of average D-max and the formulat slot indicates that the value of average D-max can be derived by summing up the red-D-max, the green-D-max, and the blue-D-max and then dividing by 3.

ADDITIONAL DATA FRAME]

As used herein, the additional data refers to the chemical data (such as specific gravity and the concentration of certain chemicals in processing solution) and the physical data (such as temperature and replenishment rate of a processing solution). From the viewpoint of the operation of a photofinishing process, these are the basic parameters in controlling the process. However, from a process diagnostic point of view, this data may or may not be available, and often troubleshooting recommendatins have to be made even in the absence of this data. An additional data frame includes the following slots:

1. The name of additional data.
2. The standard value of the additional data.
3. The tolerance limit around the standard value.
4. The actual value of the additional data.

The additional data name slot identifies the name of the additional value. Its value is to be entered during the target experimental station building stage. The standard value slot identifies the reference operating point of that additional data. Photofinishing process designers usually have recommendations about these reference operating points. However, different processing laboratories may wan to deviate from such recommendations for their own reasons. Thus, Expert System Builder 80 can tailor-make reference operating points by entering the appropriate value during the target expert system building stage. The tolerance slot identifies the operating region of that additional data. Again, photofinishing process designers make recommendations about these operating regions while different laboratories may bent to deviate from such recommendations. The additional data value slot contains the actual value of the parameter. It is to be entered by an end user of the Target Expert System 88 during the consultation stage at the prompt of the system. The following table lists eight additional parameter frame instances using Knowledge Base Editor 72.

```
KBE> l add
add 1:
        name: First Developer time
```

-continued

```
        standard: 6.0
        tolerance: 1.0
add 2:
        name: First Developer temperature
        standard: 100.4
        tolerance: 2.5
add 3:
        name: First Developer replenishment rate
        standard: 200.0
        tolerance: 20.0
add 4:
        name: First Developer specific gravity
        standard: 1.059
        tolerance: 0.01
add 5:
        name: First Wash time
        standard: 2.0
        tolerance 0.2
add 6:
        name: First Wash temperature
        standard: 97.5
        tolerance: 5.5
add 7:
        name: First Wash replenishment rate
        standard: 0.0
        tolerance: 0.0
add 8:
        name: First Wash specific gravity
        standard: 1.0
        tolerance: 0.01
```

Taking the first frame instance as an example, the name slot has a value of first developer time. The standard value slot states that 6 minutes is the standard for the first developer time. The tolerance slot indicates that the actual first developer time should stay within 1 minute around the standard time.

[SYMPTOM DESCRIPTION FRAME]

Different photofinishing processes may have different symptoms associated with each one of them. The symptom description frame is used to name the symptom, describe the conditions ascribed to the symptom, and give possible underlying causes of the symptom. A symptom description frame contains the following slots:

1. The name of the symptom;
2. The variable number of slots for the conditions of the symptom;
3. A variable number of slots for the possible underlying causes.

The symptom name slot identifies the name of that symptom. Its value is to be entered during the target expert system building stage. The condition slots are relational expressions relating the control strip parameters and/or the derived parameters of the symptom. These conditions are expressed as relational expressions with an implicit logic term "AND" joining them together. They are to be entered during the target expert system building stage.

The possible underlying cause slots identify the possible causes of the symptom and their corresponding attenuation factors. Thus, each slot actually consists of two sub-slots. The first sub-slot contains the description of the possible cause and the second sub-slot contains the attenuation factor of that cause. Both sub-slots are to be entered during the target expert building stage. The following table lists two symptom description frame instances using the Knowledge Base Editor.

```
KBE> l sym
sym 1:
```

-continued symptom: high D-max
condition 1: ave_D-max > 0
possible cause 1: Color Developer too dilute
attenuation factor: 60
possible cause 2: First Developer underreplenished
attenuation factor: 25
possible cause 3: Color Developer underreplenished
attenuation factor: 25
possible cause 4: First Developer too dilute
attenuation factor: 15
possible cause 5: First Developer & Color Developer reversed
attenuation factor: 01
possible cause 6: First Developer omitted
attenuation factor: 01
sym 2:
symptom: low green-red D-max
condition 1: ave_D-max < 0
condition 2: red_D-max < ave_D-max
condition 3: green_D-max < ave_D-max
possible cause 1: Color Developer replenisher has too much part A
attenuation factor: 50
possible cause 2: Color Developer pH high
attenuation factor: 40
possible cause 3: Color Developer contaminated with First Developer
attenuation factor: 05
possible cause 4: Too Little Color Developer Starter
attenuation factor: 05

Taking the first frame instance as an example, the symptom name slot has a value of color developer too dilute. There is only one condition slot which states that the condition for the symptom is the average D-max greater than zero. There are six possible cause slots. They are: color developer too dilute, first developer underreplenished, color developer underreplenished, first developer too dilute, first developer and color developer reversed, and first developer omitted with the correspondingly listed attenuation factors.

[CAUSE-SOLUTION DESCRIPTION FRAME]

The cause-solution description frame contains information relating a possible cause to the relevant additional data, the evidence, and the solution in the control problem for that particular cause. A cause/solution description frame includes the following slots:

1. The name of the possible cause
2. The relevant additional data concerning the possible cause
3. The confirming evidence of the additional data
4. The solution prescribed to fix the problem.

The possible cause name slots identifies the name of that possible cause. This definition is to be entered during the target expert system building stage. The relevant additional data slot provides a linkage between the cause-solution description frame and the additional data frame. When a possible cause is generated during a target expert system consultation session as a hypothesis, and if the relevant additional data slot is not empty, the system prompts the end-user to enter the value of that additional data and checks the standard and tolerance slots of the additional data frame to update the certainty of that possible cause. This slot is to be entered during the target expert system building stage.

The evidence slot is an indicator in which direction (high or low) of the additional data deviation from the standard constitutes the confirming evidence. This slot is also to be entered during the target expert system building stage.

The solution slot contains a description of how to fix the problem concerning that possible cause. This slot is to be entered also during the target expert building stage. Referring to the earlier table which contains the listing of seven cause-solution description frame instances and taking as an example the sixth frame instance, the possible cause name slot has a value stating that the color developer is overconcentrated. The relevant data slot indicates that the specific gravity of the color developer is relevant data to this possible cause. The confirming evidence slot shows that a high value of the specific gravity is the confirming evidence. The solution slot suggests that adding water to the color developing may solve the problem.

It is possible that two different symptoms in a photofinishing process control problem point to two conflicting possible causes. Instead of allowing both conflicting causes to be presented to an end-user during consultation, the system identifies the conflicting possible causes and resolves the conflict by weighing the certainty factors associated with these causes. The possible cause with a lower certainty factor for instance, CF1 will be eliminated while the one with the higher certainty factor for instance, CF2 will remain but with its certainty reduced to (CF2−CF1)/1−CF1).

This formula is compatible with the one described in the section on possible causes merging. For example, if $CF=CF1+CF2-CF1*CF2$, then $CF1=(CF-CF2)/(1-CF2)$ and $CF2=(CF-CF1)(1-CF1)$.

A conflicting cause-pair description frame consists of the following slots:

1. The name of the first possible cause.
2. The name of the second possible cause.

Both slots together identify a conflicting possible cause-pair and they are to be entered during the target expert system building stage.

The following is a list of eleven conflicting cause-pair frame instances using the Knowledge Base Editor.

```
KBE> l ccp
ccp 1:
        cause1: Color Developer concentrated
        cause2: Color Developer too dilute
ccp 2:
        cause1: Color Developer overreplenished
        cause2: Color Developer underreplenished
ccp 3:
        cause1: Color Developer pH high
        cause2: Color Developer pH low
ccp 4:
        cause1: Color Developer replenisher has too much part A
        cause2: Color Developer replenisher has too much part B
ccp 5:
        cause1: Color Developer temperature high
        cause2: Color Developer temperature low
ccp 6:
        cause1: First Developer overconcentrated
        cause2: First Developer too dilute
ccp 7:
        cause1: First Developer overreplenished
        cause2: First Developer underreplenished
ccp 8:
        cause1: First Developer temperature high
        cause2: First Developer temperature low
ccp 9:
        cause1: First Developer time too long
        cause2: First Developer time too short
ccp 10:
        cause1: First Wash temperature high
        cause2: First Wash temperature low
ccp 11:
        cause1: Too little Color Developer starter
        cause2: Too much Color Developer starter
```

Taking the first frame instance as an example, color developer overconcentrated and color developer too dilute are two conflicting possible causes. If during the consultation stage, both possible causes are suggested with certainty factors 80 percent and 60 percent, respectively, then color developer too dilute is eliminated while color developer overconcentrated will have a new certainty factor which is equal to 50 percent ((0.80−0.60)/(1−0.60)).

SHELL PROGRAM

The purpose of Shell Program 84 is to take Intermediate Knowledge File 82 produced by Knowledge Base Editor 72 as an input and produce Target Knowledge Base 86 of Target Expert System 88. Shell Program 84 consists of two modules—1. Data Definition Module 74 contains the definitions of various frames as described earlier; and 2. Shell Main Module 76 contains routines that take Intermediate Knowledge File 82 as an input and generates the Target Knowledge Base 86 of Target Expert System 88.

TARGET EXPERT SYSTEM

Target Expert System 88 is the desired output of Expert System Builder 80 using this expert system building tool. It is the program that will be used by end-users for photofinishing process control problem consultation. The following are the requirements for Target Expert System 88:

1. Prompt the end-users to provide control strip parameters. For those control strip parameter instances defined during the expert system building stage, Target Expert System 88 tries to fill up the unknown parameter value slots during the consultation stage.
2. Calculate the derived parameters. Based on the derived parameter frame instances during the expert system building stage, once the underlying deriving parameters are available, Target Expert System 88 will calculate the value of the derived parameters.
3. Generate the symptoms and the possible causes. With the control strip parameter values and the derived parameter values known, Target Expert System 88 will deduce all the symptoms and the possible causes.
4. Prompt the end-users to provide the relevant additional data. When there are possible causes that can be further confirmed or disconfirmed with additional data, Target Expert System 88 will request that data.
5. Generate and propogate certainty factors. As symptoms are generated, possible causes deduced and merged and additional data gathered, Target Expert System 88 maintains the certainty factors and propogates them to the final presentation stage.
6. Provide explanation facilities. During consultation, Target Expert System 88 allows the user to question why certain additional data may be needed or now the system arrived at its conclusions.
7. Present final diagnosis to the end-users. When the diagnosis is done, Target Expert System 88 presents the final diagnosis of the control problem to the end user.

Target Expert System 88 consists of the following three components:

1. The Data Definition Module 74
2. The Target Knowledge Base 86 and
3. The Expert System Skeleton Module 78.

Data Definition Module 74 contains the definitions of various frames, as described earlier. Target Knowledge Base 86 is the output of Shell Program 84 based on the input to Expert System Builder 80. Expert System Skeleton Module 78 contains control structures that use Data Definition Module 74 and Target Knowledge Base 86 to diagnose the presented photofinishing process control problem and to provide explanations to users' questions.

IMPLEMENTATION

After the design of the logical structure of the photofinishing process diagnostic expert system tool is in place, the next step is to implement the tool. The following description will attempt to incorporate a description of each of the main modules and its function during the implementation phase.

The purpose of Knowledge Base Editor 72 is to provide a convenient interface for Expert System Builder 80 to create and modify Target Knowledge Base 86. The output of Knowledge Base Editor 72 is Intermediate Knowledge File 82. This program is written in C with six input files corresponding to the six pre-defined frames and one output file known as the Intermediate Knowledge File 82.

In Data Definition Module 74, all the pre-defined frames are represented as classes of working memory elements in OPS5. An example of a working memory element definition in OPS5 is as follows (LITERALIZE, CONFLICTING_CAUSE_PAIR CAUSE 1, CAUSE 2). Using this language, "literalize" is a key word for defining working memory elements; the second member of the list conflict cause pair is the class name; and the remaining members of the list such as "Cause 1" and "Cause 2" are attributes of the working memory element.

SHELL MAIN MODULE

Figure 12:
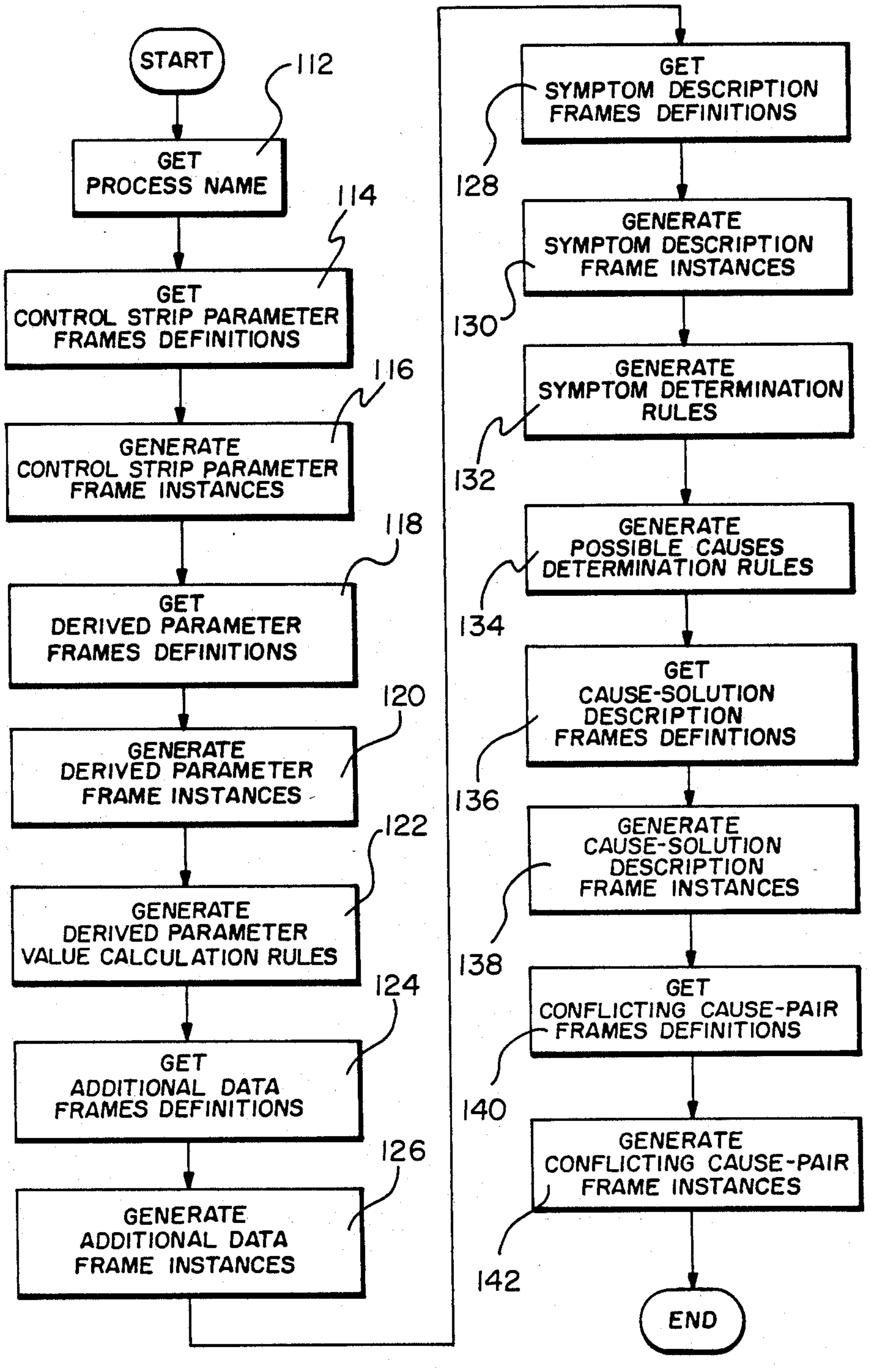
FIG. 12 is a flow chart for the Shell Main Module.

FIG. 12 illustrates the flow chart for Shell Main Module 76, which allows Expert System Builder 80 to build up and move one photofinishing process diagnostic system. Accordingly, instruction 112 identifies the name of the intended system.

Because each photofinishing process uses different control strip parameters, instruction 114 is used to diagnose that process. Given the control strip parameters that are required, instruction 116 generates the data structures (frames) for Target Expert System 88 to store the actual values of the control strip parameters. This instruction is also used to guide Target Expert System 88 in acquiring control strip data from Target Expert System User 90.

Often times, it is helpful to examine the overall bearing of a group of control strip parameters rather than individual ones. Derived parameters refer to the tendency or trend of these groups of control strip parameters. Instruction 118 has the expert system builder provide the names of such derived parameters, as well as how these derived parameters can be calculated from the control strip parameters and other derived parameters.

Given the drived parameters that are required, the instruction 120 generates the data structure (frames) for Target Expert System 88 to store the actual value of the derived parameters. With the names of the derived parameters already entered and how they can be calculated, instruction 122 generates production rules for Target Expert System 88 to compute the values of these derived parameters.

Because additional data associated with the mechanical and chemical parameters are useful in diagnosing a photofinishing process, the quality of the diagnosis depends on this data, which data may or may not be readily available. Instruction 124 identifies the names of this additional data, their standard values and their tolerance limits. Instruction 126 generates the data structures (frames) for Target Expert System 88 to store the actual values of the additional data. These frames will also be consulted during diagnosis by comparing the actual values against the standards and the tolerance limits.

With symptoms being the characterization of the problems of the photofinishing process, instruction 128 identifies the names of various symptoms, how they relate to the control strip parameters and the derived parameters, as well as the possible underlying causes and their respective likelihoods. Instruction 130 generates the data structures (frames) describing the symptoms for the target expert system to consult during diagnosis. Instruction 132 generates production rules for Target Expert System 80 to deduce the symptoms in the process based on the actual values of the control strip parameters and the derived parameters.

Instruction 134 generates production rules for the Target Expert System 88 to deduce the possible causes and their respective likelihoods based on the actual symptoms deduced.

Instruction 136 identifies the names of all possible causes, the additional data and confirming evidence relevant to the determinates of these possible causes, as well as the prescriptions to solve the problems. The data structures (frames) are generated by instruction 138 describing the possible causes for Target Expert System 88 to consult during diagnosis. Instruction 140 can then identify the possible causes that conflict with one another.

Finally, instruction 142 generates the data structures (frames) describing such conflicting cause-pairs for Target Expert System 88 to consult during diagnosis.

The actual software used in Shell Main Module 76 are listed in Appendix B at the end of the Specification.

Shell Main Module 76 is also written in OPS5. Its function is to read Intermediate Knowledge File 82 and create Target Knowledge Base 86. This is done in the following six phases:

1. Generate the control strip parameter frame instances.
2. Generate the derived parameter frame instances and the corresponding value deriving production rules.
3. Generate the additional data frame instances.
4. Generate the symptom description frame instances, production rules for determining the symptoms from the conditions, and production rules for deducing the possible causes.
5. Generate the cause-solution description frame instances.
6. Generate the conflicting cause-pair description frame instances.

The first, third, fifth and sixth phases are very similar and straightforward. A typical frame instance that is generated is as follows: (CONFLICTING_CAUSE_PAIR CAUSE1 6 CAUSE2 18).

In the OPS5 language, this is an instance of a working memory element with conflicting_cause pair being the class name, cause 1 and cause 2 attibute types, and 6 and 18 the contents of the attributes of indices pointing to the cause descriptions.

In the second phase, besides generating the derived parameter frame instances, production rules for deriving the values of parameters are also generated. The following is a typical example of such a production rule:

```
(P G:1
(CONTEXT   STATE CAL_DP)
{ (CSP   ID AVE_D-MAX   VAL NIL) <CSP> }
(CSP   ID RED_D-MAX   VAL {<P0> <=> 0 } )
CSP   ID GREEN_D-MAX   VAL {<P1> <=> 0 } )
CSP   ID BLUE_D-MAX   VAL }<P2> <=> 0 } )
→
(MODIFY <CSP>   VAL (COMPUTE ( <P0> + <P1> +
<P2> ) // 3)))
```

In OPS5, the "P" is a key word to denote a production rule, the identifier "G:1" is the rule name. Each rule name has to be distinct, and the "G:1" is formed by using the built-in function genatom, which generates a distinct atom every time it is called. The next five lines are the conditions for the rule trigger. The last line is the action to be taken when all five conditions are met.

In other words, the first condition states that the state of the target system has to be in the derived parameter calculation mode. The second condition states that there exists a derived parameter frame instance (AVE_D-MAX) whose value slot is known. The third to fifth conditions state that the components for calculating for the AVE D-MAX are availabilites of the RED_D-MAX, the GREEN D-MAX, and the BLUE_D-MAX. The action is to calculate the average value of the RED_D-MAX, the GREEN_D-MAX, and the BLUE_D-MAX to form the AVERAGE D-MAX.

In the fourth phase, besides generating the symptom description frame instances, production rules for generating systems are also constructed. The following is a typical example of such a production rule.

```
(P G:15
(CSP   ID AVE_D-MAX   VAL { <P0> < 0 } )
(CSP   ID RED_D-MAX   VAL { <P1> < <P0> } )
(CSP   ID BLUE_D-MAX   VAL { <P2> < <P0> } )
→
(MAKE SYMPTOM   ID LOW BLUE D-MAX   SYM_CODE (
GENATOM ) )))
```

In this example, the condition of the symptom is that the AVERAGE D-MAX is less than zero while the RED_D MAX and the BLUE_D-MAX are both less than the AVERAGE D-MAX. The action is to generate a symptom of low GREEN_D-MAX.

Also in the fourth phase, production rules for generating possible causes are also constructed. The following is a typical example of such a production rule.

```
(P G:16
(SYMPTOM   ID LOW GREEN D-MAX   SYM_CODE <SC>)
→
(MAKE CAUSE   CAUSE_CODE 45   AF 50
  SYM_CODE <SC>)
(MAKE CAUSE   CAUSE_CODE 6   AF 40
  SYM_CODE <SC>)
(MAKE CAUSE   CAUSE_CODE 24   AF 10
  SYM_CODE <SC>))
```

The meaning of this example is that when there is a symptom of LOW GREEN D-MAX, then the possible causes are those that the indices 45, 6 and 24 are pointing to with the certainty factors of 0.50. 0.40, and 0.10, respectively.

EXPERT SYSTEM SKELETON MODULE

Figure 13:
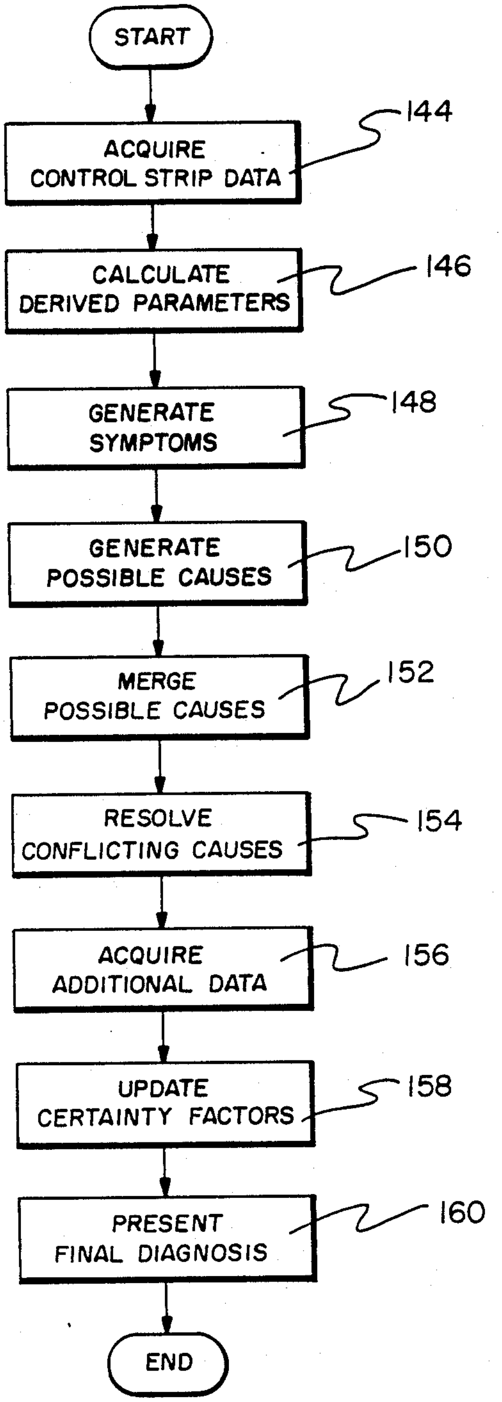
FIG. 13 is a flow chart for the Expert System Skeleton Module.

FIG. 13 illustrates the flow chart for Expert System Skeleton Module 78. The program begins with the "acquire control strip data" instruction 144 which causes the computer to examine the control strip parameter frame instances in Target Knowledge Base 86 and prompts Target Expert System User 90 to provide the control strip data required. Instruction 146 examines the derived parameter frame instances in Target Knowledge Base 86 and calculates the values of the derived parameters using the actual control strip data and the derived parameter value calculation rules in Target Knowledge Base 86.

The symptom determination rules in Target Knowledge Base 86 are examined per instruction 148 which also generates the symptoms of the process base on the actual control strip data and the derived parameter values. Instruction 150 results in the generation of the possible causes determination rules in Target Knowledge Base 86 which results in the generation of the possible causes and their respective likelihoods of the process problem base on the symptoms derived. Instruction 152 merges common possible causes generated from different symptoms and increases the likelihood of such possible causes.

The "resolve conflicting causes" instruction 154 examines the list of possible causes generated and checks them against the conflicting cause-pairs in Target Knowledge Base 86. If there are such conflicting pairs, it eliminates the less likely possible causes and reduces the likelihood of the more likely possible causes. The next step, instruction 154 examines the list of possible causes generated and checks the cause-solution frames instances in Target Knowledge Base 86. If there are relevant data associated with the possible causes, it prompts Target Expert System User 90 via instruction 156 to provide such information.

The "update certainty factors" instruction 158 reviews the values of the additional data provided by Target Expert System User 90 to adjust the likelihoods (certainty factors) or eliminate possible causes. Instruction 160 presents the final diagnosis of the process to Target Expert System User 90.

The actual software used in Expert System Skeleton Module 78 are listed in Appendix C at the end of the Specification.

Expert System Skeleton Module 78 uses the frame instances and the production rules generated in Target Knowledge Base 86 to help end-users solve photofinishing process control problems. This is done in the following four phases:

1. Acquire control strip data and calculate derived parameters.
2. Generate and merge possible causes followed by conflicting causes resolution.
3. Acquire additional data and update certainty factors.
4. Present the final diagnosis.

The first phase prompts an end-user for the control strip parameter values, and, after all the control strip parameter values are available, it uses the derived data production rules to calculate the derived data parameter values.

The second phase uses the symptom condition production rules to find out all the symptoms in the process. Once all the symptoms in the process are found, the system uses the possible cause production rules to find the possible causes. Then it combines possible causes that have the same cause description to form new (higher) certainty factors and/or uses the conflicting cause-pair description frames to form new (lower) certainty factors.

The third phase uses the relevant additional data slot in the cause-solution description frame instances to prompt the end-user to enter the relevant additional data value. In the event that the user questions why the additional data is needed, it uses the linkage between symptom and possible causes frames to provide the answer. It then uses the standard value and tolerance slots of the additional data frame to update the certainty factors of the possible causes.

The last phase displays all the possible causes generated one by one in descending order. In the event that the end user questions how the system arrives at its conclusion, it uses the linkage between symptoms and possible causes frames to give the answer. If the end-user asks for the prescription of the problem solution, the system uses the presription slot of the cause-solution description frames to give the advice. The following Tables A and B show a typical consultation session of a target expert system.

TABLE A

```
run e6
>>> Control Strip Parameters Gathering <<<
Enter RED_D-MAX: -10
Enter GREEN_D-MAX: -6
Enter BLUE_D-MAX: -48
Enter RED_COLOR: -9
Enter GREEN_COLOR: -7
Enter BLUE_COLOR: -30
Enter RED_SPEED: -1
Enter GREEN_SPEED: 0
Enter BLUE_SPEED: -14
Enter RED_D-MIN: -1
Enter GREEN_D_D-MIN: 1
Enter BLUE_D-MIN: 0
>>> Diagnosing <<<
```

TABLE B

```
>>> relevant Additional Data Gathering <<<
    enter Color Developer specific gravity: help
    enter the additional data or
    type <cr> if the data is not available
    why for explanation
    stop to terminate questioning
enter Color Developer specific gravity: why
    ***there is symptom of LOW CONTRAST ( 95 )
    ***possible cause ( 96 ) : Color Developer
    overconcentrated
enter Color Developer specific gravity: 1.04
enter First Developer specific gravity: why
    ***there is symptom of FAST PROCESS ( 50 ) :
    ***possible cause ( 50 ): First Developer
    overconcentrated
enter First Developer specific gravity: 1.034
enter First Developer replenishment rate:
Color Developer replenishment rate: stop
>>> Diagnosis <<<
===== possible cause ( 88 ) : Color Developer pH low
>>> help
type <cr> for next possible cause
    how for explanation
    end to terminate session >>> how
    ***there is symptom of LOW BLUE D-MAX ( 60 )
        AND FAST PROCESS ( 5 )
    ***with Color Developer specific gravity = 1.04
        (std = 1.035 +/- 0.1000000E-01) >>>
===== possible cause ( 28 ) : Color Developer
underreplenished >>>
=====possible cause ( 28 ) : First Developer
overreplenished >>> end
>>> End of Session <<<
```

In this example, when Target Expert System 88 was evoked by entering "run e6" the system responded by requesting the 12 control strip parameters for Process E-6. After the 12 readings were gathered, the system started diagnosing. A diagnosing process includes derived parameters, calculation, symptoms generation, possible causes generated, possible cause merging and conflicting cause resolution. These steps were not listed so as not to overburden the end-user with unnecessary details. After all possible causes are generated and merged, and the conflicts resolved, the system will prompt the user to enter any relevant additional data. The system first requests a color developer specific gravity. As a result of a "help response", the system will explain what the possible choices of action are. When the end-user asks why the color developer specific gravity was needed, the system will respond with the explanations. Subsequently, the user enters 1.04 for the color developer specific gravity, and 1.034 for first developer specific gravity, not available for first developer replenishment rate, and stops the additional gathering session when the color developer replenishment rate is requested.

The system then presents the diagnosis with color developer pH low as the most likely cause (80 percent certainty). When the end-user asks how the conclusion was arrived at, the system provides the explanations. The system may then present a few more possible causes and finally, the consultation will be terminated when the end-user enters "end".

The actual software used in Knowledge Base Editor 72 and Data Definition Module 74 are listed in Appendices D and E respectively.

The programs shown in the Appendices all run under the VAX/VMS TM Operating System of Digital Equipment Corporation. The Shell Main Module 76, Data Definition Module 74 and the Expert System Skeleton Module 78 are written in OPS5; the Knowledge Base Editor 72 is written in C; and the input/output utility module is written in FORTRAN.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

Copyright 1987 Eastman Kodak Company
all rights reserved

Target Knowledge Base

```
(P  G:40
    ( SYMPTOM ^ ID low contrast ^ SYM_CODE <SC> )
 -->
    ( MAKE CAUSE ^cause_code 6 ^cf 95 ^sym_code <sc> )
    ( MAKE CAUSE ^cause_code 50 ^cf 5 ^sym_code <sc> ))
(P  G:39
    ( CSP ^id AVE_COLOR ^val { <P1> } )
    ( CSP ^id AVE_SPEED ^val { <P0> > <P1> } )
 -->
    ( MAKE SYMPTOM ^ ID low contrast ^ SYM_CODE ( GENATOM ) ))
(P  G:38
    ( SYMPTOM ^ ID high contrast ^ SYM_CODE <SC> )
 -->
    ( MAKE CAUSE ^cause_code 18 ^cf 95 ^sym_code <sc> )
    ( MAKE CAUSE ^cause_code 52 ^cf 5 ^sym_code <sc> ))
(P  G:37
    ( CSP ^id AVE_COLOR ^val { <P1> } )
    ( CSP ^id AVE_SPEED ^val { <P0> < <P1> } )
 -->
    ( MAKE SYMPTOM ^ ID high contrast ^ SYM_CODE ( GENATOM ) ))
(P  G:36
    ( SYMPTOM ^ ID yellow-neutral high D-min ^ SYM_CODE <SC> )
 -->
    ( MAKE CAUSE ^cause_code 44 ^cf 40 ^sym_code <sc> )
    ( MAKE CAUSE ^cause_code 42 ^cf 40 ^sym_code <sc> )
    ( MAKE CAUSE ^cause_code 43 ^cf 10 ^sym_code <sc> )
    ( MAKE CAUSE ^cause_code 39 ^cf 10 ^sym_code <sc> ))
(P  G:35
    ( CSP ^id AVE_D-MIN ^val { <P0> > 0 } )
    ( CSP ^id RED_D-MIN ^val { <P1> <= <P0> } )
    ( CSP ^id GREEN_D-MIN ^val { <P2> <= <P0> } )
 -->
    ( MAKE SYMPTOM ^ ID yellow-neutral high D-min ^ SYM_CODE ( GENATOM ) ))
```

```
(P  G:34
   ( SYMPTOM ^ ID fast process ^ SYM_CODE <SC> )
 -->
   ( MAKE CAUSE ^cause_code 27 ^cf 50 ^sym_code <sc> )
   ( MAKE CAUSE ^cause_code 28 ^cf 20 ^sym_code <sc> )
   ( MAKE CAUSE ^cause_code 32 ^cf 5 ^sym_code <sc> )
   ( MAKE CAUSE ^cause_code 30 ^cf 5 ^sym_code <sc> )
   ( MAKE CAUSE ^cause_code 6 ^cf 5 ^sym_code <sc> )
   ( MAKE CAUSE ^cause_code 23 ^cf 5 ^sym_code <sc> )
   ( MAKE CAUSE ^cause_code 24 ^cf 5 ^sym_code <sc> )
   ( MAKE CAUSE ^cause_code 22 ^cf 5 ^sym_code <sc> )
   ( MAKE CAUSE ^cause_code 50 ^cf 5 ^sym_code <sc> )
   ( MAKE CAUSE ^cause_code 7 ^cf 5 ^sym_code <sc> ))
(P  G:33
   ( CSP ^id AVE_SPEED ^val { <P0> < 0 } )
 -->
   ( MAKE SYMPTOM ^ ID fast process ^ SYM_CODE ( GENATOM ) ))
(P  G:32
   ( SYMPTOM ^ ID slow process ^ SYM_CODE <SC> )
 -->
   ( MAKE CAUSE ^cause_code 35 ^cf 40 ^sym_code <sc> )
   ( MAKE CAUSE ^cause_code 29 ^cf 20 ^sym_code <sc> )
   ( MAKE CAUSE ^cause_code 34 ^cf 15 ^sym_code <sc> )
   ( MAKE CAUSE ^cause_code 31 ^cf 5 ^sym_code <sc> )
   ( MAKE CAUSE ^cause_code 33 ^cf 5 ^sym_code <sc> )
   ( MAKE CAUSE ^cause_code 25 ^cf 5 ^sym_code <sc> )
   ( MAKE CAUSE ^cause_code 52 ^cf 5 ^sym_code <sc> )
   ( MAKE CAUSE ^cause_code 15 ^cf 5 ^sym_code <sc> )
   ( MAKE CAUSE ^cause_code 8 ^cf 1 ^sym_code <sc> )
   ( MAKE CAUSE ^cause_code 5 ^cf 1 ^sym_code <sc> )
   ( MAKE CAUSE ^cause_code 19 ^cf 1 ^sym_code <sc> )
   ( MAKE CAUSE ^cause_code 18 ^cf 1 ^sym_code <sc> ))
(P  G:31
   ( CSP ^id AVE_SPEED ^val { <P0> > 0 } )
 -->
   ( MAKE SYMPTOM ^ ID slow process ^ SYM_CODE ( GENATOM ) ))
(P  G:30
   ( SYMPTOM ^ ID cyan color balance ^ SYM_CODE <SC> )
 -->
   ( MAKE CAUSE ^cause_code 10 ^cf 50 ^sym_code <sc> )
   ( MAKE CAUSE ^cause_code 35 ^cf 35 ^sym_code <sc> )
   ( MAKE CAUSE ^cause_code 19 ^cf 35 ^sym_code <sc> )
   ( MAKE CAUSE ^cause_code 45 ^cf 10 ^sym_code <sc> )
   ( MAKE CAUSE ^cause_code 37 ^cf 5 ^sym_code <sc> ))
(P  G:29
   ( CSP ^id AVE_COLOR ^val { <P4> } )
   ( CSP ^id AVE_SPEED ^val { <P5> } )
   ( CSP ^id GREEN_COLOR ^val { <P0> < <P4> } )
   ( CSP ^id BLUE_COLOR ^val { <P1> < <P4> } )
   ( CSP ^id GREEN_SPEED ^val { <P2> < <P5> } )
   ( CSP ^id BLUE_SPEED ^val { <P3> < <P5> } )
 -->
   ( MAKE SYMPTOM ^ ID cyan color balance ^ SYM_CODE ( GENATOM ) ))
(P  G:28
   ( SYMPTOM ^ ID red color balance ^ SYM_CODE <SC> )
 -->
   ( MAKE CAUSE ^cause_code 1 ^cf 80 ^sym_code <sc> )
   ( MAKE CAUSE ^cause_code 36 ^cf 15 ^sym_code <sc> )
   ( MAKE CAUSE ^cause_code 20 ^cf 15 ^sym_code <sc> ))
(P  G:27
   ( CSP ^id AVE_COLOR ^val { <P4> } )
   ( CSP ^id AVE_SPEED ^val { <P5> } )
```

```
    ( CSP ^id GREEN_COLOR ^val { <P0> > <P4> } )
    ( CSP ^id BLUE_COLOR ^val { <P1> > <P4> } )
    ( CSP ^id GREEN_SPEED ^val { <P2> > <P5> } )
    ( CSP ^id BLUE_SPEED ^val { <P3> > <P5> } )
 -->
    ( MAKE SYMPTOM ^ ID red color balance ^ SYM_CODE ( GENATOM ) ))
(P  G:26
    ( SYMPTOM ^ ID yellow-cyan color balance ^ SYM_CODE <SC> )
 -->
    ( MAKE CAUSE ^cause_code 2 ^cf 50 ^sym_code <sc> )
    ( MAKE CAUSE ^cause_code 3 ^cf 50 ^sym_code <sc> ))
(P  G:25
    ( CSP ^id AVE_COLOR ^val { <P4> } )
    ( CSP ^id AVE_SPEED ^val { <P5> } )
    ( CSP ^id RED_COLOR ^val { <P0> < <P4> } )
    ( CSP ^id GREEN_COLOR ^val { <P1> < <P4> } )
    ( CSP ^id RED_SPEED ^val { <P2> < <P5> } )
    ( CSP ^id BLUE_SPEED ^val { <P3> < <P5> } )
 -->
    ( MAKE SYMPTOM ^ ID yellow-cyan color balance ^ SYM_CODE ( GENATOM ) ))
(P  G:24
    ( SYMPTOM ^ ID green color balance ^ SYM_CODE <SC> )
 -->
    ( MAKE CAUSE ^cause_code 6 ^cf 50 ^sym_code <sc> )
    ( MAKE CAUSE ^cause_code 47 ^cf 25 ^sym_code <sc> )
    ( MAKE CAUSE ^cause_code 48 ^cf 25 ^sym_code <sc> ))
(P  G:23
    ( CSP ^id AVE_COLOR ^val { <P4> } )
    ( CSP ^id AVE_SPEED ^val { <P5> } )
    ( CSP ^id RED_COLOR ^val { <P0> > <P4> } )
    ( CSP ^id BLUE_COLOR ^val { <P1> > <P4> } )
    ( CSP ^id RED_SPEED ^val { <P2> > <P5> } )
    ( CSP ^id BLUE_SPEED ^val { <P3> > <P5> } )
 -->
    ( MAKE SYMPTOM ^ ID green color balance ^ SYM_CODE ( GENATOM ) ))
(P  G:22
    ( SYMPTOM ^ ID magenta color balance ^ SYM_CODE <SC> )
 -->
    ( MAKE CAUSE ^cause_code 18 ^cf 80 ^sym_code <sc> ))
(P  G:21
    ( CSP ^id AVE_COLOR ^val { <P4> } )
    ( CSP ^id AVE_SPEED ^val { <P5> } )
    ( CSP ^id RED_COLOR ^val { <P0> < <P4> } )
    ( CSP ^id BLUE_COLOR ^val { <P1> < <P4> } )
    ( CSP ^id RED_SPEED ^val { <P2> < <P5> } )
    ( CSP ^id BLUE_SPEED ^val { <P3> < <P5> } )
 -->
    ( MAKE SYMPTOM ^ ID magenta color balance ^ SYM_CODE ( GENATOM ) ))
(P  G:20
    ( SYMPTOM ^ ID yellow color balance ^ SYM_CODE <SC> )
 -->
    ( MAKE CAUSE ^cause_code 9 ^cf 60 ^sym_code <sc> )
    ( MAKE CAUSE ^cause_code 7 ^cf 15 ^sym_code <sc> )
    ( MAKE CAUSE ^cause_code 14 ^cf 15 ^sym_code <sc> )
    ( MAKE CAUSE ^cause_code 13 ^cf 5 ^sym_code <sc> )
    ( MAKE CAUSE ^cause_code 17 ^cf 1 ^sym_code <sc> )
    ( MAKE CAUSE ^cause_code 35 ^cf 1 ^sym_code <sc> )
    ( MAKE CAUSE ^cause_code 41 ^cf 1 ^sym_code <sc> )
    ( MAKE CAUSE ^cause_code 40 ^cf 1 ^sym_code <sc> )
    ( MAKE CAUSE ^cause_code 4 ^cf 1 ^sym_code <sc> )
    ( MAKE CAUSE ^cause_code 47 ^cf 1 ^sym_code <sc> )
    ( MAKE CAUSE ^cause_code 48 ^cf 1 ^sym_code <sc> )
```

```
    ( MAKE CAUSE ^cause_code 52 ^cf 1 ^sym_code <sc> )
    ( MAKE CAUSE ^cause_code 49 ^cf 1 ^sym_code <sc> ))
(P  G:19
    ( CSP ^id AVE_COLOR ^val { <P2> } )
    ( CSP ^id RED_COLOR ^val { <P0> < <P2> } )
    ( CSP ^id GREEN_COLOR ^val { <P1> < <P2> } )
 -->
    ( MAKE SYMPTOM ^ ID yellow color balance ^ SYM_CODE ( GENATOM ) ))
(P  G:18
    ( SYMPTOM ^ ID blue color balance ^ SYM_CODE <SC> )
 -->
    ( MAKE CAUSE ^cause_code 10 ^cf 70 ^sym_code <sc> )
    ( MAKE CAUSE ^cause_code 19 ^cf 15 ^sym_code <sc> )
    ( MAKE CAUSE ^cause_code 12 ^cf 10 ^sym_code <sc> )
    ( MAKE CAUSE ^cause_code 38 ^cf 5 ^sym_code <sc> )
    ( MAKE CAUSE ^cause_code 39 ^cf 5 ^sym_code <sc> )
    ( MAKE CAUSE ^cause_code 16 ^cf 1 ^sym_code <sc> )
    ( MAKE CAUSE ^cause_code 8 ^cf 1 ^sym_code <sc> )
    ( MAKE CAUSE ^cause_code 46 ^cf 1 ^sym_code <sc> )
    ( MAKE CAUSE ^cause_code 51 ^cf 1 ^sym_code <sc> )
    ( MAKE CAUSE ^cause_code 53 ^cf 1 ^sym_code <sc> )
    ( MAKE CAUSE ^cause_code 50 ^cf 1 ^sym_code <sc> ))
(P  G:17
    ( CSP ^id AVE_COLOR ^val { <P2> } )
    ( CSP ^id RED_COLOR ^val { <P0> > <P2> } )
    ( CSP ^id GREEN_COLOR ^val { <P1> > <P2> } )
 -->
    ( MAKE SYMPTOM ^ ID blue color balance ^ SYM_CODE ( GENATOM ) ))
(P  G:16
    ( SYMPTOM ^ ID low green D-max ^ SYM_CODE <SC> )
 -->
    ( MAKE CAUSE ^cause_code 45 ^cf 50 ^sym_code <sc> )
    ( MAKE CAUSE ^cause_code 6 ^cf 40 ^sym_code <sc> )
    ( MAKE CAUSE ^cause_code 24 ^cf 10 ^sym_code <sc> ))
(P  G:15
    ( CSP ^id AVE_D-MAX ^val { <P0> < 0 } )
    ( CSP ^id RED_D-MAX ^val { <P1> > <P0> } )
    ( CSP ^id BLUE_D-MAX ^val { <P2> > <P0> } )
 -->
    ( MAKE SYMPTOM ^ ID low green D-max ^ SYM_CODE ( GENATOM ) ))
(P  G:14
    ( SYMPTOM ^ ID low blue-green D-max ^ SYM_CODE <SC> )
 -->
    ( MAKE CAUSE ^cause_code 23 ^cf 80 ^sym_code <sc> ))
(P  G:13
    ( CSP ^id AVE_D-MAX ^val { <P0> < 0 } )
    ( CSP ^id GREEN_D-MAX ^val { <P1> < <P0> } )
    ( CSP ^id BLUE_D-MAX ^val { <P2> < <P0> } )
 -->
    ( MAKE SYMPTOM ^ ID low blue-green D-max ^ SYM_CODE ( GENATOM ) ))
(P  G:12
    ( SYMPTOM ^ ID low red D-max ^ SYM_CODE <SC> )
 -->
    ( MAKE CAUSE ^cause_code 1 ^cf 80 ^sym_code <sc> )
    ( MAKE CAUSE ^cause_code 8 ^cf 60 ^sym_code <sc> )
    ( MAKE CAUSE ^cause_code 36 ^cf 5 ^sym_code <sc> )
    ( MAKE CAUSE ^cause_code 20 ^cf 5 ^sym_code <sc> ))
(P  G:11
    ( CSP ^id AVE_D-MAX ^val { <P0> < 0 } )
    ( CSP ^id GREEN_D-MAX ^val { <P1> > <P0> } )
    ( CSP ^id BLUE_D-MAX ^val { <P2> > <P0> } )
 -->
```

```
   ( MAKE SYMPTOM ^ ID low red D-max ^ SYM_CODE ( GENATOM ) ))
(P  G:10
   ( SYMPTOM ^ ID low blue D-max ^ SYM_CODE <SC> )
 -->
   ( MAKE CAUSE ^cause_code 10 ^cf 60 ^sym_code <sc> )
   ( MAKE CAUSE ^cause_code 19 ^cf 20 ^sym_code <sc> )
   ( MAKE CAUSE ^cause_code 28 ^cf 10 ^sym_code <sc> )
   ( MAKE CAUSE ^cause_code 51 ^cf 5 ^sym_code <sc> )
   ( MAKE CAUSE ^cause_code 46 ^cf 2 ^sym_code <sc> )
   ( MAKE CAUSE ^cause_code 50 ^cf 2 ^sym_code <sc> ))
(P  G:9
   ( CSP ^id AVE_D-MAX ^val { <P0> < 0 } )
   ( CSP ^id RED_D-MAX ^val { <P1> > <P0> } )
   ( CSP ^id GREEN_D-MAX ^val { <P2> > <P0> } )
 -->
   ( MAKE SYMPTOM ^ ID low blue D-max ^ SYM_CODE ( GENATOM ) ))
(P  G:8
   ( SYMPTOM ^ ID low green-red D-max ^ SYM_CODE <SC> )
 -->
   ( MAKE CAUSE ^cause_code 11 ^cf 50 ^sym_code <sc> )
   ( MAKE CAUSE ^cause_code 9 ^cf 40 ^sym_code <sc> )
   ( MAKE CAUSE ^cause_code 2 ^cf 5 ^sym_code <sc> )
   ( MAKE CAUSE ^cause_code 49 ^cf 5 ^sym_code <sc> ))
(P  G:7
   ( CSP ^id AVE_D-MAX ^val { <P0> < 0 } )
   ( CSP ^id RED_D-MAX ^val { <P1> < <P0> } )
   ( CSP ^id GREEN_D-MAX ^val { <P2> < <P0> } )
 -->
   ( MAKE SYMPTOM ^ ID low green-red D-max ^ SYM_CODE ( GENATOM ) ))
(P  G:6
   ( SYMPTOM ^ ID high D-max ^ SYM_CODE <SC> )
 -->
   ( MAKE CAUSE ^cause_code 18 ^cf 60 ^sym_code <sc> )
   ( MAKE CAUSE ^cause_code 35 ^cf 25 ^sym_code <sc> )
   ( MAKE CAUSE ^cause_code 19 ^cf 25 ^sym_code <sc> )
   ( MAKE CAUSE ^cause_code 34 ^cf 15 ^sym_code <sc> )
   ( MAKE CAUSE ^cause_code 21 ^cf 1 ^sym_code <sc> )
   ( MAKE CAUSE ^cause_code 26 ^cf 1 ^sym_code <sc> ))
(P  G:5
   ( CSP ^id AVE_D-MAX ^val { <P0> > 0 } )
 -->
   ( MAKE SYMPTOM ^ ID high D-max ^ SYM_CODE ( GENATOM ) ))
(P  G:4
   ( CONTEXT ^ STATE CAL_DP ) {
   ( CSP ^ ID AVE_D-MIN ^ VAL NIL ) <CSP> }
   ( CSP ^id RED_D-MIN ^val { <P0> <=> 0 } )
   ( CSP ^id GREEN_D-MIN ^val { <P1> <=> 0 } )
   ( CSP ^id BLUE_D-MIN ^val { <P2> <=> 0 } )
 -->
   ( MODIFY <CSP> ^ VAL ( compute ( <p0> + <p1> + <p2> ) // 3 ) ))
(P  G:3
   ( CONTEXT ^ STATE CAL_DP ) {
   ( CSP ^ ID AVE_SPEED ^ VAL NIL ) <CSP> }
   ( CSP ^id RED_SPEED ^val { <P0> <=> 0 } )
   ( CSP ^id GREEN_SPEED ^val { <P1> <=> 0 } )
   ( CSP ^id BLUE_SPEED ^val { <P2> <=> 0 } )
 -->
   ( MODIFY <CSP> ^ VAL ( compute ( <p0> + <p1> + <p2> ) // 3 ) ))
(P  G:2
   ( CONTEXT ^ STATE CAL_DP ) {
   ( CSP ^ ID AVE_COLOR ^ VAL NIL ) <CSP> }
   ( CSP ^id RED_COLOR ^val { <P0> <=> 0 } )
```

```
    ( CSP ^id GREEN_COLOR ^val { <P1> <=> 0 } )
    ( CSP ^id BLUE_COLOR ^val { <P2> <=> 0 } )
 -->
    ( MODIFY <CSP> ^ VAL ( compute ( <p0> + <p1> + <p2> ) // 3 ) ))
(P  G:1
    ( CONTEXT ^ STATE CAL_DP ) {
    ( CSP ^ ID AVE_D-MAX ^ VAL NIL ) <CSP> }
    ( CSP ^id RED_D-MAX ^val { <P0> <=> 0 } )
    ( CSP ^id GREEN_D-MAX ^val { <P1> <=> 0 } )
    ( CSP ^id BLUE_D-MAX ^val { <P2> <=> 0 } )
 -->
    ( MODIFY <CSP> ^ VAL ( compute ( <p0> + <p1> + <p2> ) // 3 ) ))
(P  PRE_START {
    ( PRE-START ) <PS> }
 -->
    ( ADDSTATE E6 )
    ( REMOVE <PS> )
    ( MAKE START ))
```

Shell Main Module

```
(external getline)
(external getaccept)
(external spread)

(vector-attribute body)
(vector-attribute sym)
(vector-attribute csp)
(vector-attribute cause)
(vector-attribute cond)
(vector-attribute prot)
(vector-attribute apot)

(literalize prod-rule
        body
)

(literalize t_sym
        sym
)

(literalize t_csp
        csp
)

(literalize t_cause
        cause
)

(literalize t_cond
        cond
)

(literalize protasis
        prot
)

(literalize apotasis
        apot
)

(literalize t_soln
        soln
)
```

```
;***** program initialization *****

(startup
        (make pre-start)        ;start program
        (make end)              ;end program
        (strategy mea)
        (watch 0)
        (disable halt)
        (run)
)


;***** pre-start production *****

(p pre-start
        { <ps>
          (pre-start) }
     -->
        (remove <ps>)
        (write (crlf)(crlf)|Enter process name: |)
        (build pre_start
                { (pre-start) <ps> }
                -->
                (addstate \\ (accept) )
                (remove <ps>)
                (make start))
        (make start)
)

;***** start production *****

(p start
        { <start>
          (start) }
     -->
        (remove <start>)
        (write (crlf)(crlf)|>>> Control Strip Parameter Definition <<<|(crlf))
        (make context ^state get_csp ^seq_no 1)
)

;***** get control strip paramaters *****

(p get_csp
        { <context>
        (context ^state get_csp ^parm nil) }
     -->
        (write (crlf) |Enter control strip parameter name: |)
        (modify <context> ^parm (acceptline |!|))
)

(p get_csp_comment
        { <context>
        (context ^state get_csp ^seq_no <sn> ^parm |!| ) }
     -->
        (write (crlf) |Re-enter control strip parameter name: |)
        (remove <context> )
        (make context ^state get_csp ^seq_no <sn> ^parm (acceptline |!|))
)


;***** get control strip paramaters *****

(p create_csp
        { <context>
```

```
        (context ^state get_csp ^seq_no <sn> ) }
    -->
        (make csp ^seq_no <sn> ^id (substr <context> parm inf) )
        (remove <context> )
        (make context ^state get_csp ^seq_no (compute <sn> + 1) )
)

;***** end of control strip paramaters definition *****

(p end_csp
        { <context>
        (context ^state get_csp ^parm |#| ) }
    -->
        (write (crlf)(crlf)|>>> Cause-Solution Description <<<| )
        (remove <context> )
        (make context ^state get_dp ^seq_no 1)
)

(p get_dp
        { <context>
        (context ^state get_dp ^seq_no <sn> ^parm nil) }
    -->
        (write (crlf)(crlf) |Enter derived parameter name: |)
        (remove <context> )
        (make context ^state get_dp ^seq_no <sn> ^parm (acceptline |!| ))
)

(p get_dp_comment
        { <context>
        (context ^state get_dp ^seq_no <sn> ^parm |!| ) }
    -->
        (write (crlf)(crlf) |Re-enter derived parameter name: |)
        (remove <context> )
        (make context ^state get_dp ^seq_no <sn> ^parm (acceptline |!| ))
)

;***** get derived parameter components *****

(p create_dp_1
        { <context>
        (context ^state get_dp ) }
    -->
        (make csp ^id (substr <context> parm inf) )
        (make t_csp )
        (modify <context> ^state get_dp_2)
)

(p create_dp_2a
        { <context>
        (context ^state get_dp_2 ) }
        { <csp>
          (t_csp ^csp nil ) }
    -->
        (write |Enter parameter: |)
        (modify <csp> ^csp (acceptline |!|))
)

(p create_dp_2a_comment
        { <context>
        (context ^state get_dp_2 ) }
        { <csp>
          (t_csp ^csp |!| ) }
    -->
```

```
        (write |Re-enter parameter: |)
        (remove <csp> )
        (make t_csp ^csp (acceptline |!|))
)

(p create_dp_2b
        { <context>
        (context ^state get_dp_2 ^seq_no <sn> ) }
        { <csp> (t_csp ) }
  -->
        (write |Enter condition: |)
        (make protasis ^seq_no <sn> ^prot
                |^id| (substr <csp> csp inf)
                |^val {| (acceptline = 0) |<=> 0 }| )
        (modify <context> ^seq_no (compute <sn> + 1))
        (write |Enter parameter: |)
        (remove <csp> )
        (make t_csp ^csp (acceptline |!|))
)
        (p create_dp_2c
                { <context>
                (context ^state get_dp_2  ) }
                { <csp>
                  (t_csp ^csp |#| ) }
            -->
                (write (crlf)(crlf))
                (remove <csp>)
                (make t_cond)
        )

        (p create_dp_2d
                { <context>
                (context ^state get_dp_2 ) }
                { <cond>
                  (t_cond ^cond nil ) }
            -->
                (write |Enter expression: |)
                (modify <cond> ^cond (getaccept))
                (modify <context> ^state get_dp_3)
        )

        (p create_dp_3a1
                { <context>
                (context ^state get_dp_3 ) }
                { <csp> (csp ^seq_no nil) }
                { <prot> (protasis ) }
                { <cond> (t_cond) }
            -->
                (build  \\ (genatom)
                        (context ^state cal_dp)
                        { (csp ^id \\ (substr <csp> id inf) ^val nil ) <csp>}
                        (csp \\ (substr <prot> prot inf) )
                        -->
                        (modify <csp> ^val (
                        \\ (substr <cond> cond inf) ) ) )
                (modify <csp> ^seq_no dp)
                (remove <context> )
                (make context ^state get_dp ^seq_no 1)
                (remove <cond> )
                (remove <prot> )
        )

        (p create_dp_3a2
                { <context>
                (context ^state get_dp_3 ) }
```

```
        { <csp> (csp ^seq_no nil) }
        { <prot> (protasis ^seq_no 1) }
        { <prot2> (protasis ^seq_no 2) }
        { <cond> (t_cond) }
    -->
        (build  \\ (genatom)
                (context ^state cal_dp)
                { (csp ^id \\ (substr <csp> id inf) ^val nil ) <csp>}
                (csp \\ (substr <prot> prot inf) )
                (csp \\ (substr <prot2> prot inf) )
                -->
                (modify <csp> ^val (
                \\ (substr <cond> cond inf) ) ) )
        (modify <csp> ^seq_no dp)
        (remove <context> )
        (make context ^state get_dp ^seq_no 1)
        (remove <cond> )
        (remove <prot> )
        (remove <prot2> )
)

(p create_dp_3a3
        { <context>
        (context ^state get_dp_3 ) }
        { <csp> (csp ^seq_no nil) }
        { <prot> (protasis ^seq_no 1) }
        { <prot2> (protasis ^seq_no 2) }
        { <prot3> (protasis ^seq_no 3) }
        { <cond> (t_cond) }
    -->
        (build  \\ (genatom)
                (context ^state cal_dp)
                { (csp ^id \\ (substr <csp> id inf) ^val nil ) <csp>}
                (csp \\ (substr <prot> prot inf) )
                (csp \\ (substr <prot2> prot inf) )
                (csp \\ (substr <prot3> prot inf) )
                -->
                (modify <csp> ^val (
                \\ (substr <cond> cond inf) ) ) )
        (modify <csp> ^seq_no dp)
        (remove <context> )
        (make context ^state get_dp ^seq_no 1)
        (remove <cond> )
        (remove <prot> )
        (remove <prot2> )
        (remove <prot3> )
)

;***** end of derived parameters definition *****

(p end_dp
        { <context>
        (context ^state get_dp ^parm |#| ) }
    -->
        (write (crlf)(crlf)|>>> Additional Data Description <<<| )
        (remove <context> )
        (make context ^state get_ad ^seq_no 1 )
)

;***** get additional data descriptions *****

(p get_ad
        { <context>
```

```
        (context ^state get_ad ^parm nil) }
    -->
        (write (crlf)(crlf) |Enter additional data parameter: |)
        (modify <context> ^parm (getline |!|))
)

(p get_ad_comment
        { <context>
        (context ^state get_ad ^parm |!| ) }
    -->
        (write (crlf) |Re-enter additional data parameter: |)
        (modify <context> ^parm (getline |!|))
)

(p get_std_1
        { <context>
        (context ^state get_ad ^parm <id> ^seq_no <sn>) }
    -->
        (write (crlf) |Enter standard value: |)
        (make ad_data ^id <id> ^seq_no <sn> ^std (accept) )
        (modify <context> ^seq_no (compute <sn> + 1))
)

(p get_std_2
        { <context>
        (context ^state get_ad ) }
        { <ad>
        (ad_data ^tol nil) }
    -->
        (write (crlf) |Enter tolerance: |)
        (modify <ad> ^tol (accept) )
        (modify <context> ^parm nil)
)

;***** end of additional data description *****

(p end_get_ad
        { <context>
        (context ^state get_ad ^parm |#| ) }
    -->
        (write (crlf)(crlf)|>>> Cause-solution Description <<<| (crlf))
        (remove <context> )
        (make context ^state get_cause ^seq_no 1 )
)

;***** get cause-solution descriptions *****

(p get_cause
        { <context>
        (context ^state get_cause ^parm nil) }
    -->
        (write (crlf) |Enter cause description: |)
        (modify <context> ^parm (getline |!|))
)

(p get_cause_comment
        { <context>
        (context ^state get_cause ^parm |!| ) }
    -->
        (write (crlf) |Re-enter cause description: |)
        (modify <context> ^parm (getline |!|))
)

(p end_get_cause
        { <context>
```

```
        (context ^state get_cause ^parm <id> ^seq_no <sn> ) }
    -->
        (make cause_soln ^cause_code <sn> ^cause_id <id> )
        (modify <context> ^state get_rel_data ^parm nil)
)

(p get_rel_data
        { <context>
        (context ^state get_rel_data ^seq_no <sn> ^parm nil ) }
    -->
        (write (crlf) |Enter relevant additional data: |)
        (modify <context> ^parm (getline ) )
)

(p get_evidence
        { <context>
        (context ^state get_rel_data ^parm <id> ) }
        { <cs>
        (cause_soln ^rel_data nil) }
        (ad_data ^id <id> ^seq_no <sn>)
    -->
        (write (crlf) |Enter confirming evidence (high or low): |)
        (modify <cs> ^rel_data <sn> ^evidence (accept))
        (modify <context> ^state get_soln ^parm nil )
        (make t_soln ^soln The solution is:)
)

(p no_rel_data
        { <context>
        (context ^state get_rel_data ^parm <> nil ) }
        { <cs>
        (cause_soln ^rel_data nil) }
    -->
        (write (crlf) |Enter confirming evidence (high or low): |)
        (modify <cs> ^rel_data none ^evidence (accept))
        (modify <context> ^state get_soln ^parm nil )
        (make t_soln ^soln The solution is:)
)

(p get_soln
        { <context>
        (context ^state get_soln ^seq_no <sn> ^parm nil ) }
        { <soln> (t_soln) }
    -->
        (write (crlf) |Enter solution description: |)
        (write (crlf)(tabto 9))
        (modify <context> ^parm (acceptline |#|) )
)

(p get_soln_cont
        { <context>
        (context ^state get_soln ^seq_no <sn> ) }
        { <soln> (t_soln) }
    -->
        (write (crlf)(tabto 9))
        (modify <soln> ^soln (substr <soln> soln inf) (tabto 11)
                          (substr <context> parm inf))
        (remove <context> )
        (make context ^state get_soln ^seq_no <sn> ^parm (acceptline #) )
)

(p get_soln_end
        { <context>
        (context ^state get_soln ^seq_no <sn> ^parm # ) }
        { <soln> (t_soln) }
```

```
        { <cs> (cause_soln ^soln nil) }
    -->
        (modify <cs> ^soln (substr <soln> soln inf) )
        (remove <soln> )
        (remove <context> )
        (make context ^state get_cause ^seq_no (compute <sn> + 1) )
)

;***** end of cause-solution description *****

(p end_soln
        { <context>
        (context ^state get_cause ^parm |#| ) }
    -->
        (write (crlf)(crlf)|>>> Cause-pair Defintion <<<| )
        (remove <context> )
        (make context ^state cause_pair )
)

;***** get cause-pair descriptions *****

(p get_cause_pair
        { <context>
        (context ^state cause_pair ^parm nil) }
    -->
        (write (crlf) |Enter cause pair 1: |)
        (modify <context> ^parm (getline |!|))
)

(p cause_pair_comment
        { <context>
        (context ^state cause_pair ^parm |!| ) }
    -->
        (write (crlf) |Re-enter cause pair 1: |)
        (modify <context> ^parm (getline |!|))
)

(p cause_pair_2
        { <context>
        (context ^state cause_pair ^parm <id> ) }
        (cause_soln ^cause_id <id> ^cause_code <cc> )
        - (cause_pair ^cause_code1 nil)
    -->
        (make cause_pair ^cause_code1 <cc> )
        (write (crlf) |Enter cause pair 2: |)
        (modify <context> ^parm (getline) )
)

(p cause_pair_2_end
        { <context>
        (context ^state cause_pair ^parm <id> ) }
        (cause_soln ^cause_id <id> ^cause_code <cc> )
        { <cp> (cause_pair ^cause_code2 nil) }
    -->
        (modify <cp> ^cause_code2 <cc> )
        (modify <context> ^parm nil )
)

;***** end of cause-pair description *****

(p end_cause_pair
        { <context>
        (context ^state cause_pair ^parm |#| ) }
    -->
```

```
        (write (crlf)(crlf)|>>> Rule Defintion <<<| )
        (remove <context> )
        (make context ^state get_rule_1 ^seq_no 1)
)

(p get_rule
        { <context>
        (context ^state get_rule_1 ^parm nil) }
    -->
        (write (crlf)(crlf) |Enter symptom name: |)
        (modify <context> ^parm,(getline))
)

(p get_rule_comment
        { <context>
        (context ^state get_rule_1 ^parm |!| ) }
    -->
        (write (crlf)(crlf) |Re-enter symptom name: |)
        (modify <context> ^parm (getline))
)

;***** get rule components *****

(p create_rule_1
        { <context>
        (context ^state get_rule_1 ) }
    -->
        (make t_sym ^sym (substr <context> parm inf) )
        (make t_csp )
        (modify <context> ^state get_rule_2)
)

(p create_rule_2a
        { <context>
        (context ^state get_rule_2 ) }
        { <csp>
          (t_csp ^csp nil ) }
    -->
        (write |Enter parameter: |)
        (modify <csp> ^csp (acceptline |!|))
)

(p create_rule_2a_comment
        { <context>
        (context ^state get_rule_2 ) }
        { <csp>
          (t_csp ^csp |!| ) }
    -->
        (write |Re-enter parameter: |)
        (remove <csp> )
        (make t_csp ^csp (acceptline |!|))
)

(p create_rule_2b
        { <context>
        (context ^state get_rule_2 ^seq_no <sn> ) }
        { <csp> (t_csp ) }
  -->
        (write |Enter condition: |)
        (make protasis ^seq_no <sn> ^prot
                |^id| (substr <csp> csp inf)
                |^val {| (acceptline = 0) |}| )
        (modify <context> ^seq_no (compute <sn> + 1))
        (write |Enter parameter: |)
        (remove <csp> )
```

```
        (make t_csp ^csp (acceptline |!|))
)

(p create_rule_2c
        { <context>
        (context ^state get_rule_2 ) }
        { <csp>
          (t_csp ^csp |#| ) }
   -->
        (write (crlf)(crlf))
        (remove <csp>)
        (modify <context> ^seq_no 101 )
        (make t_cause)
)
(p create_rule_2d
        { <context>
        (context ^state get_rule_2 ) }
        { <cause>
          (t_cause ^cause nil ) }
   -->
        (write |Enter cause: |)
        (modify <cause> ^cause (getline))
)

(p create_rule_2d_comment
        { <context>
        (context ^state get_rule_2 ) }
        { <cause>
          (t_cause ^cause |!| ) }
   -->
        (write |Re-enter cause: |)
        (modify <cause> ^cause (getline))
)

(p create_rule_2e
        { <context>
        (context ^state get_rule_2 ^seq_no <sn> ) }
        { <cause> (t_cause ^cause <id> ) }
        (cause_soln ^cause_id <id> ^cause_code <cc>)
   -->
        (write |Enter certainty factor: |)
        (make apotasis ^seq_no <sn> ^apot
                |^cause_code| <cc>
                |^cf| (acceptline = 0) |^sym_code <sc>| )
        (modify <context> ^seq_no (compute <sn> + 1))
        (write |Enter cause: |)
        (remove <cause> )
        (make t_cause ^cause (getline))
)

(p create_rule_2f
        { <context>
        (context ^state get_rule_2 ) }
        { <cause>
          (t_cause ^cause |#| ) }
   -->
        (remove <cause>)
        (modify <context> ^state get_rule_3)
)

(p create_rule_3a1
        { <context>
        (context ^state get_rule_3 ) }
        { <sym> (t_sym) }
```

```
        { <prot> (protasis ^seq_no 1 ) }
    -->
        (build  \\ (genatom)
                (csp \\ (substr <prot> prot inf) )
                -->
                (make symptom ^id
                \\ (substr <sym> sym inf)
                ^sym_code (genatom) ) )
        (remove <prot> )
)

(p create_rule_3a2
        { <context>
        (context ^state get_rule_3 ) }
        { <sym> (t_sym) }
        { <prot> (protasis ^seq_no 1 ) }
        { <prot2> (protasis ^seq_no 2 ) }
    -->
        (build  \\ (genatom)
                (csp \\ (substr <prot> prot inf) )
                (csp \\ (substr <prot2> prot inf) )
                -->
                (make symptom ^id
                \\ (substr <sym> sym inf)
                ^sym_code (genatom) ) )
        (remove <prot> )
        (remove <prot2> )
)

(p create_rule_3a3
        { <context>
        (context ^state get_rule_3 ) }
        { <sym> (t_sym) }
        { <prot> (protasis ^seq_no 1 ) }
        { <prot2> (protasis ^seq_no 2 ) }
        { <prot3> (protasis ^seq_no 3 ) }
    -->
        (build  \\ (genatom)
                (csp \\ (substr <prot> prot inf) )
                (csp \\ (substr <prot2> prot inf) )
                (csp \\ (substr <prot3> prot inf) )
                -->
                (make symptom ^id
                \\ (substr <sym> sym inf)
                ^sym_code (genatom) ) )
        (remove <prot> )
        (remove <prot2> )
        (remove <prot3> )
)

(p create_rule_3a4
        { <context>
        (context ^state get_rule_3 ) }
        { <sym> (t_sym) }
        { <prot> (protasis ^seq_no 1 ) }
        { <prot2> (protasis ^seq_no 2 ) }
        { <prot3> (protasis ^seq_no 3 ) }
        { <prot4> (protasis ^seq_no 4 ) }
    -->
        (build  \\ (genatom)
                (csp \\ (substr <prot> prot inf) )
                (csp \\ (substr <prot2> prot inf) )
                (csp \\ (substr <prot3> prot inf) )
                (csp \\ (substr <prot4> prot inf) )
                -->
```

```
        (make symptom ^id
        \\ (substr <sym> sym inf)
        ^sym_code (genatom) ) )
    (remove <prot> )
    (remove <prot2> )
    (remove <prot3> )
    (remove <prot4> )
))

(p create_rule_3a5
    { <context>
    (context ^state get_rule_3 ) }
    { <sym> (t_sym) }
    { <prot> (protasis ^seq_no 1 ) }
    { <prot2> (protasis ^seq_no 2 ) }
    { <prot3> (protasis ^seq_no 3 ) }
    { <prot4> (protasis ^seq_no 4 ) }
    { <prot5> (protasis ^seq_no 5 ) }
  -->
    (build  \\ (genatom)
        (csp \\ (substr <prot> prot inf) )
        (csp \\ (substr <prot2> prot inf) )
        (csp \\ (substr <prot3> prot inf) )
        (csp \\ (substr <prot4> prot inf) )
        (csp \\ (substr <prot5> prot inf) )
        -->
        (make symptom ^id
        \\ (substr <sym> sym inf)
        ^sym_code (genatom) ) )
    (remove <prot> )
    (remove <prot2> )
    (remove <prot3> )
    (remove <prot4> )
    (remove <prot5> )
)

(p create_rule_3a6
    { <context>
    (context ^state get_rule_3 ) }
    { <sym> (t_sym) }
    { <prot> (protasis ^seq_no 1 ) }
    { <prot2> (protasis ^seq_no 2 ) }
    { <prot3> (protasis ^seq_no 3 ) }
    { <prot4> (protasis ^seq_no 4 ) }
    { <prot5> (protasis ^seq_no 5 ) }
    { <prot6> (protasis ^seq_no 6 ) }
  -->
    (build  \\ (genatom)
        (csp \\ (substr <prot> prot inf) )
        (csp \\ (substr <prot2> prot inf) )
        (csp \\ (substr <prot3> prot inf) )
        (csp \\ (substr <prot4> prot inf) )
        (csp \\ (substr <prot5> prot inf) )
        (csp \\ (substr <prot6> prot inf) )
        -->
        (make symptom ^id
        \\ (substr <sym> sym inf)
        ^sym_code (genatom) ) )
    (remove <prot> )
    (remove <prot2> )
    (remove <prot3> )
    (remove <prot4> )
    (remove <prot5> )
    (remove <prot6> )
)
```

```
(p create_rule_3a7
        { <context>
        (context ^state get_rule_3 ) }
        { <sym> (t_sym) }
        { <prot> (protasis ^seq_no 1 ) }
        { <prot2> (protasis ^seq_no 2 ) }
        { <prot3> (protasis ^seq_no 3 ) }
        { <prot4> (protasis ^seq_no 4 ) }
        { <prot5> (protasis ^seq_no 5 ) }
        { <prot6> (protasis ^seq_no 6 ) }
        { <prot7> (protasis ^seq_no 7 ) }
    -->
        (build  \\ (genatom)
                (csp \\ (substr <prot> prot inf) )
                (csp \\ (substr <prot2> prot inf) )
                (csp \\ (substr <prot3> prot inf) )
                (csp \\ (substr <prot4> prot inf) )
                (csp \\ (substr <prot5> prot inf) )
                (csp \\ (substr <prot6> prot inf) )
                (csp \\ (substr <prot7> prot inf) )
                -->
                (make symptom ^id
                \\ (substr <sym> sym inf)
                ^sym_code (genatom) ) )
        (remove <prot> )
        (remove <prot2> )
        (remove <prot3> )
        (remove <prot4> )
        (remove <prot5> )
        (remove <prot6> )
        (remove <prot7> )
)

(p create_rule_3a8
        { <context>
        (context ^state get_rule_3 ) }
        { <sym> (t_sym) }
        { <prot> (protasis ^seq_no 1 ) }
        { <prot2> (protasis ^seq_no 2 ) }
        { <prot3> (protasis ^seq_no 3 ) }
        { <prot4> (protasis ^seq_no 4 ) }
        { <prot5> (protasis ^seq_no 5 ) }
        { <prot6> (protasis ^seq_no 6 ) }
        { <prot7> (protasis ^seq_no 7 ) }
        { <prot8> (protasis ^seq_no 8 ) }
    -->
        (build  \\ (genatom)
                (csp \\ (substr <prot> prot inf) )
                (csp \\ (substr <prot2> prot inf) )
                (csp \\ (substr <prot3> prot inf) )
                (csp \\ (substr <prot4> prot inf) )
                (csp \\ (substr <prot5> prot inf) )
                (csp \\ (substr <prot6> prot inf) )
                (csp \\ (substr <prot7> prot inf) )
                (csp \\ (substr <prot8> prot inf) )
                -->
                (make symptom ^id
                \\ (substr <sym> sym inf)
                ^sym_code (genatom) ) )
        (remove <prot> )
        (remove <prot2> )
        (remove <prot3> )
        (remove <prot4> )
        (remove <prot5> )
```

```
        (remove <prot6> )
        (remove <prot7> )
        (remove <prot8> )
)

(p create_rule_3b1
        { <context>
        (context ^state get_rule_3 ) }
        { <sym> (t_sym) }
        { <apot> (apotasis ^seq_no 101) }
        - (protasis)
    -->
        (build  \\ (genatom)
                (symptom ^id
                \\ (substr <sym> sym inf)
                ^sym_code <sc> )
                -->
                (make cause \\ (substr <apot> apot inf) ) )
        (remove <sym> )
        (remove <context> )
        (make context ^state get_rule_1 ^seq_no 1 )
        (remove <apot> )
)

(p create_rule_3b2
        { <context>
        (context ^state get_rule_3 ) }
        { <sym> (t_sym) }
        { <apot> (apotasis ^seq_no 101) }
        { <apot2> (apotasis ^seq_no 102) }
        - (protasis)
    -->
        (build  \\ (genatom)
                (symptom ^id
                \\ (substr <sym> sym inf)
                ^sym_code <sc> )
                -->
                (make cause \\ (substr <apot> apot inf) )
                (make cause \\ (substr <apot2> apot inf) ) )
        (remove <sym> )
        (remove <context> )
        (make context ^state get_rule_1 ^seq_no 1 )
        (remove <apot> )
        (remove <apot2> )
)

(p create_rule_3b3
        { <context>
        (context ^state get_rule_3 ) }
        { <sym> (t_sym) }
        { <apot> (apotasis ^seq_no 101) }
        { <apot2> (apotasis ^seq_no 102) }
        { <apot3> (apotasis ^seq_no 103) }
        - (protasis)
    -->
        (build  \\ (genatom)
                (symptom ^id
                \\ (substr <sym> sym inf)
                ^sym_code <sc> )
                -->
                (make cause \\ (substr <apot> apot inf) )
                (make cause \\ (substr <apot2> apot inf) )
                (make cause \\ (substr <apot3> apot inf) ) )
        (remove <sym> )
        (remove <context> )
```

```
        (make context ^state get_rule_1 ^seq_no 1 )
        (remove <apot> )
        (remove <apot2> )
        (remove <apot3> )
)

(p create_rule_3b4
        { <context>
        (context ^state get_rule_3 ) }
        { <sym> (t_sym) }
        { <apot> (apotasis ^seq_no 101) }
        { <apot2> (apotasis ^seq_no 102) }
        { <apot3> (apotasis ^seq_no 103) }
        { <apot4> (apotasis ^seq_no 104) }
        - (protasis)
    -->
        (build  \\ (genatom)
                (symptom ^id
                \\ (substr <sym> sym inf)
                ^sym_code <sc> )
                -->
                (make cause \\ (substr <apot> apot inf) )
                (make cause \\ (substr <apot2> apot inf) )
                (make cause \\ (substr <apot3> apot inf) )
                (make cause \\ (substr <apot4> apot inf) ) )
        (remove <sym> )
        (remove <context> )
        (make context ^state get_rule_1 ^seq_no 1 )
        (remove <apot> )
        (remove <apot2> )
        (remove <apot3> )
        (remove <apot4> )
)

(p create_rule_3b5
        { <context>
        (context ^state get_rule_3 ) }
        { <sym> (t_sym) }
        { <apot> (apotasis ^seq_no 101) }
        { <apot2> (apotasis ^seq_no 102) }
        { <apot3> (apotasis ^seq_no 103) }
        { <apot4> (apotasis ^seq_no 104) }
        { <apot5> (apotasis ^seq_no 105) }
        - (protasis)
    -->
        (build  \\ (genatom)
                (symptom ^id
                \\ (substr <sym> sym inf)
                ^sym_code <sc> )
                -->
                (make cause \\ (substr <apot> apot inf) )
                (make cause \\ (substr <apot2> apot inf) )
                (make cause \\ (substr <apot3> apot inf) )
                (make cause \\ (substr <apot4> apot inf) )
                (make cause \\ (substr <apot5> apot inf) ) )
        (remove <sym> )
        (remove <context> )
        (make context ^state get_rule_1 ^seq_no 1 )
        (remove <apot> )
        (remove <apot2> )
        (remove <apot3> )
        (remove <apot4> )
        (remove <apot5> )
)
```

```
(p create_rule_3b6
        { <context>
        (context ^state get_rule_3 ) }
        { <sym> (t_sym) }
        { <apot> (apotasis ^seq_no 101) }
        { <apot2> (apotasis ^seq_no 102) }
        { <apot3> (apotasis ^seq_no 103) }
        { <apot4> (apotasis ^seq_no 104) }
        { <apot5> (apotasis ^seq_no 105) }
        { <apot6> (apotasis ^seq_no 106) }
        - (protasis)
    -->
        (build  \\ (genatom)
                (symptom ^id
                \\ (substr <sym> sym inf)
                ^sym_code <sc> )
                -->
                (make cause \\ (substr <apot> apot inf) )
                (make cause \\ (substr <apot2> apot inf) )
                (make cause \\ (substr <apot3> apot inf) )
                (make cause \\ (substr <apot4> apot inf) )
                (make cause \\ (substr <apot5> apot inf) )
                (make cause \\ (substr <apot6> apot inf) ) )
        (remove <sym> )
        (remove <context> )
        (make context ^state get_rule_1 ^seq_no 1 )
        (remove <apot> )
        (remove <apot2> )
        (remove <apot3> )
        (remove <apot4> )
        (remove <apot5> )
        (remove <apot6> )
)

(p create_rule_3b7
        { <context>
        (context ^state get_rule_3 ) }
        { <sym> (t_sym) }
        { <apot> (apotasis ^seq_no 101) }
        { <apot2> (apotasis ^seq_no 102) }
        { <apot3> (apotasis ^seq_no 103) }
        { <apot4> (apotasis ^seq_no 104) }
        { <apot5> (apotasis ^seq_no 105) }
        { <apot6> (apotasis ^seq_no 106) }
        { <apot7> (apotasis ^seq_no 107) }
        - (protasis)
    -->
        (build  \\ (genatom)
                (symptom ^id
                \\ (substr <sym> sym inf)
                ^sym_code <sc> )
                -->
                (make cause \\ (substr <apot> apot inf) )
                (make cause \\ (substr <apot2> apot inf) )
                (make cause \\ (substr <apot3> apot inf) )
                (make cause \\ (substr <apot4> apot inf) )
                (make cause \\ (substr <apot5> apot inf) )
                (make cause \\ (substr <apot6> apot inf) )
                (make cause \\ (substr <apot7> apot inf) ) )
        (remove <sym> )
        (remove <context> )
        (make context ^state get_rule_1 ^seq_no 1 )
        (remove <apot> )
        (remove <apot2> )
        (remove <apot3> )
```

```
        (remove <apot4> )
        (remove <apot5> )
        (remove <apot6> )
        (remove <apot7> )
)

(p create_rule_3b8
        { <context>
        (context ^state get_rule_3 ) }
        { <sym> (t_sym) }
        { <apot> (apotasis ^seq_no 101) }
        { <apot2> (apotasis ^seq_no 102) }
        { <apot3> (apotasis ^seq_no 103) }
        { <apot4> (apotasis ^seq_no 104) }
        { <apot5> (apotasis ^seq_no 105) }
        { <apot6> (apotasis ^seq_no 106) }
        { <apot7> (apotasis ^seq_no 107) }
        { <apot8> (apotasis ^seq_no 108) }
        - (protasis)
    -->
        (build  \\ (genatom)
                (symptom ^id
                \\ (substr <sym> sym inf)
                ^sym_code <sc> )
                -->
                (make cause \\ (substr <apot> apot inf) )
                (make cause \\ (substr <apot2> apot inf) )
                (make cause \\ (substr <apot3> apot inf) )
                (make cause \\ (substr <apot4> apot inf) )
                (make cause \\ (substr <apot5> apot inf) )
                (make cause \\ (substr <apot6> apot inf) )
                (make cause \\ (substr <apot7> apot inf) )
                (make cause \\ (substr <apot8> apot inf) ) )
        (remove <sym> )
        (remove <context> )
        (make context ^state get_rule_1 ^seq_no 1 )
        (remove <apot> )
        (remove <apot2> )
        (remove <apot3> )
        (remove <apot4> )
        (remove <apot5> )
        (remove <apot6> )
        (remove <apot7> )
        (remove <apot8> )
)

(p create_rule_3b9
        { <context>
        (context ^state get_rule_3 ) }
        { <sym> (t_sym) }
        { <apot> (apotasis ^seq_no 101) }
        { <apot2> (apotasis ^seq_no 102) }
        { <apot3> (apotasis ^seq_no 103) }
        { <apot4> (apotasis ^seq_no 104) }
        { <apot5> (apotasis ^seq_no 105) }
        { <apot6> (apotasis ^seq_no 106) }
        { <apot7> (apotasis ^seq_no 107) }
        { <apot8> (apotasis ^seq_no 108) }
        { <apot9> (apotasis ^seq_no 109) }
        - (protasis)
    -->
        (build  \\ (genatom)
                (symptom ^id
                \\ (substr <sym> sym inf)
                ^sym_code <sc> )
                -->
```

```
            (make cause \\ (substr <apot> apot inf) )
            (make cause \\ (substr <apot2> apot inf) )
            (make cause \\ (substr <apot3> apot inf) )
            (make cause \\ (substr <apot4> apot inf) )
            (make cause \\ (substr <apot5> apot inf) )
            (make cause \\ (substr <apot6> apot inf) )
            (make cause \\ (substr <apot7> apot inf) )
            (make cause \\ (substr <apot8> apot inf) )
            (make cause \\ (substr <apot9> apot inf) ) )
    (remove <sym> )
    (remove <context> )
    (make context ^state get_rule_1 ^seq_no 1 )
    (remove <apot> )
    (remove <apot2> )
    (remove <apot3> )
    (remove <apot4> )
    (remove <apot5> )
    (remove <apot6> )
    (remove <apot7> )
    (remove <apot8> )
    (remove <apot9> )


(p create_rule_3b10
    { <context>
    (context ^state get_rule_3 ) }
    { <sym> (t_sym) }
    { <apot> (apotasis ^seq_no 101) }
    { <apot2> (apotasis ^seq_no 102) }
    { <apot3> (apotasis ^seq_no 103) }
    { <apot4> (apotasis ^seq_no 104) }
    { <apot5> (apotasis ^seq_no 105) }
    { <apot6> (apotasis ^seq_no 106) }
    { <apot7> (apotasis ^seq_no 107) }
    { <apot8> (apotasis ^seq_no 108) }
    { <apot9> (apotasis ^seq_no 109) }
    { <apot10> (apotasis ^seq_no 110) }
    - (protasis)
  -->
    (build  \\ (genatom)
            (symptom ^id
            \\ (substr <sym> sym inf)
            ^sym_code <sc> )
            -->
            (make cause \\ (substr <apot> apot inf) )
            (make cause \\ (substr <apot2> apot inf) )
            (make cause \\ (substr <apot3> apot inf) )
            (make cause \\ (substr <apot4> apot inf) )
            (make cause \\ (substr <apot5> apot inf) )
            (make cause \\ (substr <apot6> apot inf) )
            (make cause \\ (substr <apot7> apot inf) )
            (make cause \\ (substr <apot8> apot inf) )
            (make cause \\ (substr <apot9> apot inf) )
            (make cause \\ (substr <apot10> apot inf) ) )
    (remove <sym> )
    (remove <context> )
    (make context ^state get_rule_1 ^seq_no 1 )
    (remove <apot> )
    (remove <apot2> )
    (remove <apot3> )
    (remove <apot4> )
    (remove <apot5> )
    (remove <apot6> )
    (remove <apot7> )
    (remove <apot8> )
```

```
    (remove <apot9> )
    (remove <apot10> )
)
(p create_rule_311
        { <context>
        (context ^state get_rule_3 ) }
        { <sym> (t_sym) }
        { <apot> (apotasis ^seq_no 101) }
        { <apot2> (apotasis ^seq_no 102) }
        { <apot3> (apotasis ^seq_no 103) }
        { <apot4> (apotasis ^seq_no 104) }
        { <apot5> (apotasis ^seq_no 105) }
        { <apot6> (apotasis ^seq_no 106) }
        { <apot7> (apotasis ^seq_no 107) }
        { <apot8> (apotasis ^seq_no 108) }
        { <apot9> (apotasis ^seq_no 109) }
        { <apot10> (apotasis ^seq_no 110) }
        { <apot11> (apotasis ^seq_no 111) }
        - (protasis)
    -->
        (build  \\ (genatom)
                (symptom ^id
                \\ (substr <sym> sym inf)
                ^sym_code <sc> )
                -->
                (make cause \\ (substr <apot> apot inf) )
                (make cause \\ (substr <apot2> apot inf) )
                (make cause \\ (substr <apot3> apot inf) )
                (make cause \\ (substr <apot4> apot inf) )
                (make cause \\ (substr <apot5> apot inf) )
                (make cause \\ (substr <apot6> apot inf) )
                (make cause \\ (substr <apot7> apot inf) )
                (make cause \\ (substr <apot8> apot inf) )
                (make cause \\ (substr <apot9> apot inf) )
                (make cause \\ (substr <apot10> apot inf) )
                (make cause \\ (substr <apot11> apot inf) ) )
        (remove <sym> )
        (remove <context> )
        (make context ^state get_rule_1 ^seq_no 1 )
        (remove <apot> )
        (remove <apot2> )
        (remove <apot3> )
        (remove <apot4> )
        (remove <apot5> )
        (remove <apot6> )
        (remove <apot7> )
        (remove <apot8> )
        (remove <apot9> )
        (remove <apot10> )
        (remove <apot11> )
)

(p create_rule_3b12
        { <context>
        (context ^state get_rule_3 ) }
        { <sym> (t_sym) }
        { <apot> (apotasis ^seq_no 101) }
        { <apot2> (apotasis ^seq_no 102) }
        { <apot3> (apotasis ^seq_no 103) }
        { <apot4> (apotasis ^seq_no 104) }
        { <apot5> (apotasis ^seq_no 105) }
        { <apot6> (apotasis ^seq_no 106) }
        { <apot7> (apotasis ^seq_no 107) }
        { <apot8> (apotasis ^seq_no 108) }
        { <apot9> (apotasis ^seq_no 109) }
```

```
      { <apot10> (apotasis ^seq_no 110) }
      { <apot11> (apotasis ^seq_no 111) }
      { <apot12> (apotasis ^seq_no 112) }
      - (protasis)
   -->
      (build  \\ (genatom)
              (symptom ^id
              \\ (substr <sym> sym inf)
              ^sym_code <sc> )
              -->
              (make cause \\ (substr <apot> apot inf) )
              (make cause \\ (substr <apot2> apot inf) )
              (make cause \\ (substr <apot3> apot inf) )
              (make cause \\ (substr <apot4> apot inf) )
              (make cause \\ (substr <apot5> apot inf) )
              (make cause \\ (substr <apot6> apot inf) )
              (make cause \\ (substr <apot7> apot inf) )
              (make cause \\ (substr <apot8> apot inf) )
              (make cause \\ (substr <apot9> apot inf) )
              (make cause \\ (substr <apot10> apot inf) )
              (make cause \\ (substr <apot11> apot inf) )
              (make cause \\ (substr <apot12> apot inf) ) )
      (remove <sym> )
      (remove <context> )
      (make context ^state get_rule_1 ^seq_no 1 )
      (remove <apot> )
      (remove <apot2> )
      (remove <apot3> )
      (remove <apot4> )
      (remove <apot5> )
      (remove <apot6> )
      (remove <apot7> )
      (remove <apot8> )
      (remove <apot9> )
      (remove <apot10> )
      (remove <apot11> )
      (remove <apot12> )


create_rule_3b13
      { <context>
      (context ^state get_rule_3 ) }
      { <sym> (t_sym) }
      { <apot> (apotasis ^seq_no 101) }
      { <apot2> (apotasis ^seq_no 102) }
      { <apot3> (apotasis ^seq_no 103) }
      { <apot4> (apotasis ^seq_no 104) }
      { <apot5> (apotasis ^seq_no 105) }
      { <apot6> (apotasis ^seq_no 106) }
      { <apot7> (apotasis ^seq_no 107) }
      { <apot8> (apotasis ^seq_no 108) }
      { <apot9> (apotasis ^seq_no 109) }
      { <apot10> (apotasis ^seq_no 110) }
      { <apot11> (apotasis ^seq_no 111) }
      { <apot12> (apotasis ^seq_no 112) }
      { <apot13> (apotasis ^seq_no 113) }
      - (protasis)
   -->
      (build  \\ (genatom)
              (symptom ^id
              \\ (substr <sym> sym inf)
              ^sym_code <sc> )
              -->
              (make cause \\ (substr <apot> apot inf) )
              (make cause \\ (substr <apot2> apot inf) )
```

```
                (make cause \\ (substr <apot3> apot inf) )
                (make cause \\ (substr <apot4> apot inf) )
                (make cause \\ (substr <apot5> apot inf) )
                (make cause \\ (substr <apot6> apot inf) )
                (make cause \\ (substr <apot7> apot inf) )
                (make cause \\ (substr <apot8> apot inf) )
                (make cause \\ (substr <apot9> apot inf) )
                (make cause \\ (substr <apot10> apot inf) )
                (make cause \\ (substr <apot11> apot inf) )
                (make cause \\ (substr <apot12> apot inf) )
                (make cause \\ (substr <apot13> apot inf) ) )
        (remove <sym> )
        (remove <context> )
        (make context ^state get_rule_1 ^seq_no 1 )
        (remove <apot> )
        (remove <apot2> )
        (remove <apot3> )
        (remove <apot4> )
        (remove <apot5> )
        (remove <apot6> )
        (remove <apot7> )
        (remove <apot8> )
        (remove <apot9> )
        (remove <apot10> )
        (remove <apot11> )
        (remove <apot12> )
        (remove <apot13> )
)

;***** end of rule definition *****

(p end_get_rule
        { <context>
        (context ^state get_rule_1 ^parm |#| ) }
    -->
        (write (crlf)(crlf)|>>> Rule Generation <<<| (crlf))
        (modify <context> ^state gen_rule)
)

(p gen_rule
        (context ^state gen_rule)
        { <pr>
        (prod-rule) }
    -->
        (build \\ (substr <pr> body inf))
        (remove <pr> )
)

(p end-of_gen_rule
        { <context>
        (context ^state gen_rule) }
        - (prod-rule)
    -->
        (remove <context> )
)
;***** end production *****
(p end
        (end)
        - (start)
    -->
        (savestate exsys)
        (write (crlf)(crlf)|>>> End of Shell Program <<<| (crlf))
         shell.ops

         )
```

Expert System Skeleton Module

```
(external cal_cf)
(external spread)

(literalize t_symptom
        id
        symptom
)

;***** program initialization *****

(startup
;       (addstate exsys.dat)
        (make pre-start)
        (strategy mea)
        (watch 0)
        (disable halt)
        (run)
)

;(p pre-start
;       { <start>
;       (pre-start) }
;     -->
;       (addstate exsys.dat)
;       (remove <start>)
;       (make start)
;)
;
(p start
        { <start>
        (start) }
     -->
        (remove <start>)
        (write (crlf)(crlf) |>>> Enter Control Strip Parameters <<<| (crlf))
        (make context ^state get_csd)
)

(p get_data
        (context ^state get_csd)
        { <csp>
        (csp ^seq_no { <sn> <> dp } ^val nil) }
        - (csp ^seq_no < <sn> ^val nil)
     -->
        (write (crlf) |Enter| (substr <csp> id inf) |: | )
        (modify <csp> ^val (accept))
)

(p end_of_get_data
        { <context>
        (context ^state get_csd) }
     -->
        (write (crlf)(crlf) |>>> Calculating derived parameters <<<| (crlf))
        (modify <context> ^state cal_dp )
)

(p end_of_cal_dp
        { <context>
        (context ^state cal_dp) }
        - (csp ^val nil)
     -->
        (write (crlf)(crlf) |>>> Diagnosing <<<| (crlf))
        (modify <context> ^state merge ^seq_no 1)
)
(p pre_merge
        { <context>
        (context ^state merge ^seq_no <sn> ) }
        { <c> (cause ^cause_code <cc> ^cf <cf> ^sym_code <sc> ) }
        { <s> (symptom ^sym_code <sc> ) }
     -->
```

```
        (make t_symptom ^id (substr <s> id inf) |(| <cf> |)| ^sym_code <sn> )
        (modify <c> ^sym_code <sn> )
        (modify <context> ^seq_no (compute <sn> + 1) )
)

(p merge
        { <context>
        (context ^state merge ^seq_no <sn> ) }
        { <c1> (cause ^cause_code <cc> ^cf <cf1> ^sym_code <sc1> ) }
        { <c2> (cause ^cause_code <cc> ^cf <cf2> ^sym_code { <sc2> <> <sc1> } ) }
        (cause_pair ^cause_code1 <cc1> ^cause_code2 <cc2>)
        { <s1> (t_symptom ^sym_code <sc1> ) }
        { <s2> (t_symptom ^sym_code <sc2> ) }
    -->
        (make t_symptom ^id (substr <s1> id inf) (tabto 23) and (substr <s2> id inf)
                     ^sym_code <sn> )
        (modify <c1> ^sym_code <sn>
                    ^cf (compute <cf1> + <cf2> - ( <cf1> * <cf2> ) // 100 ) )
        (remove <c2> )
        (modify <context> ^seq_no (compute <sn> + 1) )
)

(p neg_merge_1
        { <context>
        (context ^state merge ^seq_no <sn> ) }
        { <c1> (cause ^cause_code <cc1> ^cf <cf1> ^sym_code <sc1> ) }
        { <c2> (cause ^cause_code <cc2> ^cf { <cf2> <= <cf1> }
                    ^sym_code { <sc2> <> <sc1> } ) }
        (cause_pair ^cause_code1 <cc1> ^cause_code2 <cc2>)
        { <s1> (t_symptom ^sym_code <sc1> ) }
        { <s2> (t_symptom ^sym_code <sc2> ) }
    -->
        (make t_symptom ^id (substr <s1> id inf) (tabto 23) but (substr <s2> id inf)
                     ^sym_code <sn> )
        (modify <c1> ^sym_code <sn>
                    ^cf (compute ( 100 * <cf1> - <cf2> ) // ( 100 - <cf2> ) ) )
        (remove <c2> )
        (modify <context> ^seq_no (compute <sn> + 1) )
)

(p neg_merge_2
        { <context>
        (context ^state merge ^seq_no <sn> ) }
        { <c1> (cause ^cause_code <cc1> ^cf <cf1> ^sym_code <sc1> ) }
        { <c2> (cause ^cause_code <cc2> ^cf { <cf2> <= <cf1> }
                    ^sym_code { <sc2> <> <sc1> } ) }
        (cause_pair ^cause_code1 <cc2> ^cause_code2 <cc1>)
        { <s1> (t_symptom ^sym_code <sc1> ) }
        { <s2> (t_symptom ^sym_code <sc2> ) }
    -->
        (make t_symptom ^id (substr <s1> id inf) (tabto 23) but (substr <s2> id inf)
                     ^sym_code <sn> )
        (modify <c1> ^sym_code <sn>
                    ^cf (compute ( 100 * <cf1> - <cf2> ) // ( 100 - <cf2> ) ) )
        (remove <c2> )
        (modify <context> ^seq_no (compute <sn> + 1) )
)
(p end_of_merge
        { <context>
        (context ^state merge } }
    -->
        (modify <context> ^state get_ad ^parm nil )
        (write (crlf)(crlf) |>>> Additional Data <<<| )
)

(p get_ad
        { <context>
        (context ^state get_ad ) }
        { <cause>
        (cause ^cause_code <cc> ^ad_flag nil ^cf <cf> ) }
```

```
        - (cause ^ad_flag nil ^cf > <cf> )
        (cause_soln ^cause_code <cc> ^rel_data <sn> )
        { <ad>
        (ad_data ^id <id> ^seq_no <sn> ^val nil ) }
    -->
        (write (crlf)(crlf) |enter| <id> |: |)
        (modify <cause> ^ad_flag cal)
        (modify <ad> ^val (acceptline n/a))
)

(p no_ad
        { <context>
        (context ^state get_ad ) }
        { <cause>
        (cause ^cause_code <cc> ^ad_flag nil ^cf <cf> ) }
        - (cause ^ad_flag nil ^cf > <cf> )
        (cause_soln ^cause_code <cc> ^rel_data none )
    -->
        (modify <cause> ^ad_flag none)
)

(p calculate_cf
        { <context>
        (context ^state get_ad ) }
        { <cause>
        (cause ^cause_code <cc> ^ad_flag cal ^cf <cf> ) }
        (cause_soln ^cause_code <cc> ^rel_data <sn> ^evidence <ev> )
        { <ad>
        (ad_data ^id <id> ^seq_no <sn> ^val { <val> <=> 0.0 }
                          ^std <std> ^tol <tol> ) }
    -->
        (modify <cause> ^ad_flag set ^cf (cal_cf <cf> <std> <tol> <val> <ev> ))
)

(p get_ad_why
        { <context>
        (context ^state get_ad ) }
        { <cause>
        (cause ^cause_code <cc> ^cf <cf> ^sym_code <sc> ) }
        { <sym> (t_symptom ^sym_code <sc> ) }
        (cause_soln ^cause_code <cc> ^cause_id <id> ^rel_data <sn> )
        { <ad>
        (ad_data ^id <aid> ^seq_no <sn> ^val why ) }
    -->
        (write (crlf)(crlf) |  *** there is symptom of|
                    (substr <sym> id inf) )
        (write (crlf) |  *** possible cause (| <cf>
                    |) :| <id> )
        (write (crlf)(crlf) |enter| <aid> |: |)
        (modify <ad> ^val (acceptline n/a))
)
(p get_ad_help
        { <context>
        (context ^state get_ad ) }
        { <cause>
        (cause ^cause_code <cc> ^cf <cf> ^sym_code <sc> ) }
        { <sym> (t_symptom ^sym_code <sc> ) }
        (cause_soln ^cause_code <cc> ^cause_id <id> ^rel_data <sn> )
        { <ad>
        (ad_data ^id <aid> ^seq_no <sn> ^val help ) }
    -->
        (write (crlf)(crlf) |  enter the additional data or |)
        (write (crlf) |  type <cr> if the data is not available |)
        (write (crlf) |       why for explanation |)
        (write (crlf) |       stop to terminate questioning |)
        (write (crlf)(crlf) |enter| <aid> |: |)
        (modify <ad> ^val (acceptline n/a))
)

(p get_ad_stop
```

```
        { <context>
        (context ^state get_ad ) }
        { <cause>
        (cause ^cause_code <cc> ^cf <cf> ^sym_code <sc> ) }
        { <sym> (t_symptom ^sym_code <sc> ) }
        (cause_soln ^cause_code <cc> ^cause_id <id> ^rel_data <sn> )
        { <ad>
        (ad_data ^id <aid> ^seq_no <sn> ^val stop ) }
    -->
        (modify <context> ^state diag ^parm nil )
        (write (crlf)(crlf) |>>> Diagnosis <<<| (crlf))
)

(p end_of_get_ad
        { <context>
        (context ^state get_ad ) }
    -->
        (modify <context> ^state diag ^parm nil )
        (write (crlf)(crlf) |>>> Diagnosis <<<| (crlf))
)

(p diagnosis
        { <context>
        (context ^state diag ^parm nil ) }
        { <cause>
        (cause ^cause_code <cc> ^cf <cf> ) }
        - (cause ^cf > <cf> )
        (cause_soln ^cause_code <cc> ^cause_id <id> )
    -->
        (write (crlf)(crlf) |===== possible cause (| <cf>
                        |) :| <id> | >>> |)
        (modify <context> ^parm (acceptline none))
)

(p diagnosis_how_1
        { <context>
        (context ^state diag ^parm how ) }
        { <cause>
        (cause ^cf <cf> ^sym_code <sc> ^ad_flag <> set } }
        - (cause ^cf > <cf> )
        { <sym> (t_symptom ^sym_code <sc> ) }
    -->
        (write (crlf)(crlf) |  *** there is symptom of|
                        (substr <sym> id inf) | >>> |)
        (modify <context> ^parm (acceptline none))
)

(p diagnosis_how_2
        { <context>
        (context ^state diag ^parm how ) }
        { <cause>
        (cause ^cause_code <cc> ^cf <cf> ^sym_code <sc> ^ad_flag set ) }
        - (cause ^cf > <cf> )
        (cause_soln ^cause_code <cc> ^rel_data <sn> )
        { <sym> (t_symptom ^sym_code <sc> ) }
        (ad_data ^id <id> ^seq_no <sn> ^val <val> ^std <std> ^tol <tol> )
    -->
        (write (crlf)(crlf) |  *** there is symptom of|
                        (substr <sym> id inf) )
        (write (crlf) |  *** with| <id> |=| <val> (crlf)(tabto 12)
                        |(std =| <std> |+/-| <tol> |) >>> |)
        (modify <context> ^parm (acceptline none))
)

(p diagnosis_soln
        { <context>
        (context ^state diag ^parm soln ) }
        { <cause>
        (cause ^cause_code <cc> ^cf <cf> ) }
        - (cause ^cf > <cf> )
```

```
        { <cs> (cause_soln ^cause_code <cc> ) }
    -->
        (write (crlf)(crlf) |  ***| (substr <cs> soln inf) | >>> |)
        (modify <context> ^parm (acceptline none))
)

(p diagnosis_help
        { <context>
        (context ^state diag ^parm help ) }
        { <cause>
        (cause ^cf <cf> ) }
        - (cause ^cf > <cf> )
    -->
        (write (crlf)(crlf) |  type <cr> for next possible cause |)
        (write (crlf) |       how for explanation |)
        (write (crlf) |       end to terminate session  >>>|)
        (modify <context> ^parm (acceptline none) )
)

(p diagnosis_invalid
        { <context>
        (context ^state diag ) }
        { <cause>
        (cause ^cf <cf> ) }
        - (cause ^cf > <cf> )
    -->
        (write (crlf)(crlf) |  *** invalid response *** >>> | )
        (modify <context> ^parm (acceptline none) )
)

(p diagnosis_none
        { <context>
        (context ^state diag ^parm none ) }
        { <cause>
        (cause ^cf <cf> ) }
        - (cause ^cf > <cf> )
    -->
        (modify <context> ^parm nil )
        (remove <cause>)
)

(p diagnosis_end
        { <context>
        (context ^state diag ^parm end ) }
        { <cause>
        (cause ^cf <cf> ) }
        - (cause ^cf > <cf> )
    -->
        (remove <context> )
        (remove <cause>)
)

(p end_of_diagnosis
        { <context>
        (context ^state diag) }
        - (cause)
    -->
        (remove <context>)
)

(p end
        (end)
        - (start)
    -->
        (write (crlf)(crlf) |>>> End of Session <<<| (crlf))
)
```

Knowledge Base Editor

```
#include stdio
#include ctype
#include math

#define CSP      0      /* control strip parameter */
#define DDP      1      /* derived parameter */
#define ADD      2      /* additional data */
#define CSD      3      /* cause-solution description */
#define CCP      4      /* conflicting cause-pair */
#define SYM      5      /* symptom description */
#define IFP_MAX 6       /* maximum # of input file */

#define CSP_MAX 20      /* maximum # of control strip parameter frames */
#define DDP_MAX 10      /* maximum # of derived parameter frames */
#define ADD_MAX 100     /* maximum # of additional data frames */
#define CSD_MAX 100     /* maximum # of cause solution description frames */
#define CCP_MAX 100     /* maximum # of conflicting cause pair frames */
#define SYM_MAX 100     /* maximum # of symptom description frames */
#define CND_MAX 8       /* maximum # of conditions per symptom */
#define PC_MAX  15      /* maximum # of possible cause per symptom */

/* global data definition */

FILE*   ifp;            /* input file pointers */
FILE*   ofp;            /* output file pointer */
char    pname[10];      /* process name */
char    fname[16];      /* file name */
int     flen;           /* length of file name */

char    parm_sym[10][6] = {"<p0>\n", "<p1>\n", "<p2>\n", "<p3>\n", "<p4>\n",
                "<p5>\n", "<p6>\n", "<p7>\n", "<p8>\n", "<p9>\n" };
                /* ops5 parameter symbols */

char    csp[CSP_MAX][80];       /* control strip parameters frame */
int     csp_no;         /* actual # of control strip parameter frames */

struct  {
        char name[80];  /* derived parameter name */
        char formula[80];       /* deriving formula */
        } ddp[DDP_MAX];
int     ddp_no;         /* actual # of derived parameter frames */
char    ddp_list[4][80];        /* derived parameter list */
char    ddp_opsform[80] = "compute ";   /* derived formula in ops5 form */

struct  {
        char name[80];          /* additional data name */
        char standard[80];      /* additional data standard */
        char tolerance[80];     /* additional data tolerance */
        } add[ADD_MAX];
int     add_no;         /* actual # of additional data frames */

struct  {
        char cause[80];         /* cause description */
        char rel_data[80];      /* relevant additional data */
        char evidence[80];      /* evidence */
        char solution[80];      /* solution */
        } csd[CSD_MAX];
int     csd_no;         /* actual # of cause solution description frames */

struct  {
        char cause1[80];        /* cause 1 description */
        char cause2[80];        /* cause 2 description */
        } ccp[CCP_MAX];
int     ccp_no;         /* actual # of conflicting cause pair frames */
```

```
struct  {
        char symptom[80];       /* symptom description */
        int cond_no;            /* number of conditions */
        char cond[CND_MAX][80]; /* conditions */
        int pc_no;              /* number of possible causes */
        char pc[PC_MAX][80];    /* possible cause */
        char cf[PC_MAX][80];    /* certainty factor */
        } sym[SYM_MAX];
int     sym_no;         /* actual # of symptom description frames */
char    parm_list[PC_MAX][80];  /* parameter list */
char    rel_list[PC_MAX][80];   /* relation list */
int     parm_no;                /* number of parameters */
int     aparm_no;               /* number of additional parameters */

main()
{
  char  cmnd;
  int   f_type;
  int   f_num;
  int   hi, lo;
  int   i, j;

  setup();
  for (;;)
  {
    printf("\nKBE> ");
    get_cmnd(&cmnd, &f_type, &f_num);
    printf("\n\n");
    switch (cmnd)
    {
      case 'a':
        switch (f_type)
        {
          case CSP:
            for (i=csp_no; i<CSP_MAX; i++)
            {
              printf("enter csp %d: ", i+1);
              getline(csp[i]);
              if (csp[i][0] == '\n')
              {
                csp_no = i;
                break;
              }
            }
            break;

          case DDP:
            for (i=ddp_no; i<DDP_MAX; i++)
            {
              printf("enter ddp %d:\n", i+1);
              printf("  name: ");
              getline(ddp[i].name);
              if (ddp[i].name[0] == '\n')
              {
                ddp_no = i;
                break;
              }
              printf("  formula: ");
              getline(ddp[i].formula);
            }
            break;

          case ADD:
            for (i=add_no; i<ADD_MAX; i++)
            {
              printf("enter add %d:\n", i+1);
```

```
    printf("  name: ");
    getline(add[i].name);
    if (add[i].name[0] == '\n')
    {
      add_no = i;
      break;
    }
    printf("  standard: ");
    getline(add[i].standard);
    printf("  tolerance: ");
    getline(add[i].tolerance);
  }
  break;

case CSD:
  for (i=csd_no; i<CSD_MAX; i++)
  {
    printf("enter csd %d:\n", i+1);
    printf("  cause: ");
    getline(csd[i].cause);
    if (csd[i].cause[0] == '\n')
    {
      csd_no = i;
      break;
    }
    printf("  relevant data: ");
    getline(csd[i].rel_data);
    printf("  evidence: ");
    getline(csd[i].evidence);
    printf("  solution: ");
    getline(csd[i].solution);
  }
  break;

case CCP:
  for (i=ccp_no; i<CCP_MAX; i++)
  {
    printf("enter ccp %d:\n", i+1);
    printf("  cause 1: ");
    getline(ccp[i].cause1);
    if (ccp[i].cause1[0] == '\n')
    {
      ccp_no = i;
      break;
    }
    printf("  cause 2: ");
    getline(ccp[i].cause2);
  }
  break;

case SYM:
  for (i=sym_no; i<SYM_MAX; i++)
  {
    printf("enter sym %d:\n", i+1);
    printf("  symptom: ");
    getline(sym[i].symptom);
    if (sym[i].symptom[0] == '\n')
    {
      sym_no = i;
      break;
    }
  for (j=0; j<CND_MAX; j++)
  {
    printf("  condition %d: ", j+1);
    getline(sym[i].cond[j]);
```

```
              if (sym[i].cond[j][0] == '\n')
              {
                sym[i].cond_no = j;
                break;
              }
            }
            for (j=0; j<PC_MAX; j++)
            {
              printf("  possible cause %d: ", j+1);
              getline(sym[i].pc[j]);
              if (sym[i].pc[j][0] == '\n')
              {
                sym[i].pc_no = j;
                break;
              }
              else
              {
                printf("  certainty factor: ");
                getline(sym[i].cf[j]);
              }
            }
          }
          break;

        default:
          printf("invalid frame type\n");
          break;
      }
      break;

    case 'd':
      switch (f_type)
      {
        case CSP:
          if (f_num <= 0 || f_num > csp_no)
            printf("invalid frame number\n");
          else
          {
            csp_no--;
            for (i=f_num-1; i<csp_no; i++)
            {
              strcpy(csp[i], csp[i+1]);
            }
          }
          break;

        case DDP:
          if (f_num <= 0 || f_num > ddp_no)
            printf("invalid frame number\n");
          else
          {
            ddp_no--;
            for (i=f_num-1; i<ddp_no; i++)
            {
              strcpy(ddp[i].name, ddp[i+1].name);
              strcpy(ddp[i].formula, ddp[i+1].formula);
            }
          }
          break;
        case ADD:
          if (f_num <= 0 || f_num > add_no)
            printf("invalid frame number\n");
          else
          {
            add_no--;
```

```
    for (i=f_num-1; i<add_no; i++)
    {
      strcpy(add[i].name, add[i+1].name);
      strcpy(add[i].standard, add[i+1].standard);
      strcpy(add[i].tolerance, add[i+1].tolerance);
    }
  }
  break;

case CSD:
  if (f_num <= 0 || f_num > csd_no)
    printf("invalid frame number\n");
  else
  {
    csd_no--;
    for (i=f_num-1; i<csd_no; i++)
    {
      strcpy(csd[i].cause, csd[i+1].cause);
      strcpy(csd[i].rel_data, csd[i+1].rel_data);
      strcpy(csd[i].evidence, csd[i+1].evidence);
      strcpy(csd[i].solution, csd[i+1].solution);
    }
  }
  break;

case CCP:
  if (f_num <= 0 || f_num > ccp_no)
    printf("invalid frame number\n");
  else
  {
    ccp_no--;
    for (i=f_num-1; i<ccp_no; i++)
    {
      strcpy(ccp[i].cause1, ccp[i+1].cause1);
      strcpy(ccp[i].cause2, ccp[i+1].cause2);
    }
  }
  break;

case SYM:
  if (f_num <= 0 || f_num > sym_no)
    printf("invalid frame number\n");
  else
  {
    sym_no--;
    for (i=f_num-1; i<sym_no; i++)
    {
      strcpy(sym[i].symptom, sym[i+1].symptom);
      sym[i].cond_no = sym[i+1].cond_no;
      sym[i].pc_no = sym[i+1].pc_no;
      for (j=0; j<sym[i].cond_no; j++)
        strcpy(sym[i].cond[j], sym[i+1].cond[j]);
      for (j=0; j<sym[i].pc_no; j++)
      {
        strcpy(sym[i].pc[j], sym[i+1].pc[j]);
        strcpy(sym[i].cf[j], sym[i+1].cf[j]);
      }
    }
        }
        break;

      default:
        printf("invalid frame type\n");
        break;
    }
    break;
```

```
case 'm':
  switch (f_type)
  {
    case CSP:
      if (f_num <= 0 || f_num > csp_no)
        printf("invalid frame number\n");
      printf("enter csp %d: ", f_num);
      getline(csp[f_num-1]);
      break;

    case DDP:
      if (f_num <= 0 || f_num > ddp_no)
        printf("invalid frame number\n");
      printf("enter ddp %d:\n", f_num);
      printf("  name: ");
      getline(ddp[f_num-1].name);
      printf("  formula: ");
      getline(ddp[f_num-1].formula);
      break;

    case ADD:
      if (f_num <= 0 || f_num > add_no)
        printf("invalid frame number\n");
      printf("enter add %d:\n", f_num);
      printf("  name: ");
      getline(add[f_num-1].name);
      printf("  standard: ");
      getline(add[f_num-1].standard);
      printf("  tolerance: ");
      getline(add[f_num-1].tolerance);
      break;

    case CSD:
      if (f_num <= 0 || f_num > csd_no)
        printf("invalid frame number\n");
      printf("enter csd %d:\n", f_num);
      printf("  cause: ");
      getline(csd[f_num-1].cause);
      printf("  relevant data: ");
      getline(csd[f_num-1].rel_data);
      printf("  evidence: ");
      getline(csd[f_num-1].evidence);
      printf("  solution: ");
      getline(csd[f_num-1].solution);
      break;

    case CCP:
      if (f_num <= 0 || f_num > ccp_no)
        printf("invalid frame number\n");
      printf("enter ccp %d:\n", f_num);
      printf("  cause 1: ");
      getline(ccp[f_num-1].cause1);
      printf("  cause 2: ");
      getline(ccp[f_num-1].cause2);
      break;
    case SYM:
      if (f_num <= 0 || f_num > sym_no)
        printf("invalid frame number\n");
      printf("enter sym %d:\n", f_num);
      printf("  symptom: ");
      getline(sym[f_num-1].symptom);
      for (j=0; j<CND_MAX; j++)
      {
        printf("  condition %d: ", j+1);
        getline(sym[f_num-1].cond[j]);
```

```
        if (sym[f_num-1].cond[j][0] == '\n')
        {
          sym[f_num-1].cond_no = j;
          break;
        }
      }
      for (j=0; j<PC_MAX; j++)
      {
        printf("  possible cause %d: ", j+1);
        getline(sym[f_num-1].pc[j]);
        if (sym[f_num-1].pc[j][0] == '\n')
        {
          sym[f_num-1].pc_no = j;
          break;
        }
        else
        {
          printf("  certainty factor: ");
          getline(sym[f_num-1].cf[j]);
        }
      }
      break;

    default:
      printf("invalid frame type\n");
      break;
  }
  break;

case '1':
  switch (f_type)
  {
    case CSP:
      if (f_num < 0 || f_num > csp_no)
      {
        printf("invalid frame number\n");
        break;
      }
      if (f_num == 0)
      {
        lo = 0;
        hi = csp_no-1;
      }
      else
      {
        lo = f_num-1;
        hi = f_num-1;
      }
      for (i=lo; i<=hi; i++)
      {
        printf("csp %d: ", i+1);
        printf(csp[i]);
      }
      break;

    case DDP:
      if (f_num < 0 || f_num > ddp_no)
      {
        printf("invalid frame number\n");
        break;
      }
      if (f_num == 0)
      {
        lo = 0;
        hi = ddp_no-1;
```

```
  }
  else
  {
    lo = f_num-1;
    hi = f_num-1;
  }
  for (i=lo; i<=hi; i++)
  {
    printf("ddp %d:\n", i+1);
    printf("  name: %s", ddp[i].name);
    printf("  formula: %s", ddp[i].formula);
  }
  break;

case ADD:
  if (f_num < 0 || f_num > add_no)
  {
    printf("invalid frame number\n");
    break;
  }
  if (f_num == 0)
  {
    lo = 0;
    hi = add_no-1;
  }
  else
  {
    lo = f_num-1;
    hi = f_num-1;
  }
  for (i=lo; i<=hi; i++)
  {
    printf("add %d:\n", i+1);
    printf("  name: %s", add[i].name);
    printf("  standard: %s", add[i].standard);
    printf("  tolerance: %s", add[i].tolerance);
  }
  break;

case CSD:
  if (f_num < 0 || f_num > csd_no)
  {
    printf("invalid frame number\n");
    break;
  }
  if (f_num == 0)
  {
    lo = 0;
    hi = csd_no-1;
  }
  else
  {
    lo = f_num-1;
    hi = f_num-1;
  }
  for (i=lo; i<=hi; i++)
  {
    printf("csd %d:\n", i+1);
    printf("  cause: %s", csd[i].cause);
    printf("  relevant data: %s", csd[i].rel_data);
    printf("  evidence: %s", csd[i].evidence);
    printf("  solution: %s", csd[i].solution);
  }
  break;
```

```
    case CCP:
      if (f_num < 0 || f_num > ccp_no)
      {
        printf("invalid frame number\n");
        break;
      }
      if (f_num == 0)
      {
        lo = 0;
        hi = ccp_no-1;
      }
      else
      {
        lo = f_num-1;
        hi = f_num-1;
      }
      for (i=lo; i<=hi; i++)
      {
        printf("ccp %d:\n", i+1);
        printf("  cause1: %s", ccp[i].cause1);
        printf("  cause2: %s", ccp[i].cause2);
      }
      break;

    case SYM:
      if (f_num < 0 || f_num > sym_no)
      {
        printf("invalid frame number\n");
        break;
      }
      if (f_num == 0)
      {
        lo = 0;
        hi = sym_no-1;
      }
      else
      {
        lo = f_num-1;
        hi = f_num-1;
      }
      for (i=lo; i<=hi; i++)
      {
        printf("sym %d:\n", i+1);
        printf("  symptom: %s", sym[i].symptom);
        for (j=0; j<sym[i].cond_no; j++)
        {
          printf("  condition %d: %s", j+1, sym[i].cond[j]);
        }
        for (j=0; j<sym[i].pc_no; j++)
        {
          printf("  possible cause %d: %s", j+1, sym[i].pc[j]);
          printf("  certainty factor: %s", sym[i].cf[j]);
        }
      }
      break;

    default:
      printf("invalid frame type\n");
      break;
  }
  break;

case 'h':
  printf("type a <frmae_type> to add frame\n");
  printf("type d <frame_type> <frame_no> to delete frame\n");
```

```
        printf("type h for help\n");
        printf("type l <frame_type> [<frame_no>] to list frame(s)\n");
        printf("type m <frame_type> <frame_no> to modify frame\n");
        printf("type q to quit (without update)\n");
        printf("type x to exit (with update)\n\n");
        printf("possible choices of <frame_type> are:\n");
        printf("  csp --- control strip parameter\n");
        printf("  ddp --- derived parameter\n");
        printf("  add --- additional data\n");
        printf("  csd --- cause & solution description\n");
        printf("  ccp --- conflicting cause pair\n");
        printf("  sym --- symptom description\n");
        break;

      case 'q':
        return;

      case 'x':
        update();
        return;

      default:
        printf("invalid command\n");
        break;
    }
  }
}

setup()
{
  int   i, j;

  printf("\nEnter Process Name (1-8) characters: ");
  getline(pname);
  printf("\n");
  strcpy (fname, pname);
  flen = strlen(fname);
  fname[flen-1] = '.';

  strcpy(&fname[flen], "csp");
  ifp = fopen(fname, "r+");
  for (i=0; i<CSP_MAX; i++)
  {
    if (fgets(csp[i], 80, ifp));
    else
    {
      csp_no = i;
      break;
    }
  }
  fclose(ifp);

  strcpy(&fname[flen], "ddp");
  ifp = fopen(fname, "r+");
  for (i=0; i<DDP_MAX; i++)
  {
    if (fgets(ddp[i].name, 80, ifp))
      fgets(ddp[i].formula, 80, ifp);
    else
    {
      ddp_no = i;
      break;
    }
  }
  fclose(ifp);
```

```
strcpy(&fname[flen], "add");
ifp = fopen(fname, "r+");
for (i=0; i<ADD_MAX; i++)
{
  if (fgets(add[i].name, 80, ifp))
  {
    fgets(add[i].standard, 80, ifp);
    fgets(add[i].tolerance, 80, ifp);
  }
  else
  {
    add_no = i;
    break;
  }
}
fclose(ifp);

strcpy(&fname[flen], "csd");
ifp = fopen(fname, "r+");
for (i=0; i<CSD_MAX; i++)
{
  if (fgets(csd[i].cause, 80, ifp))
  {
    fgets(csd[i].rel_data, 80, ifp);
    fgets(csd[i].evidence, 80, ifp);
    fgets(csd[i].solution, 80, ifp);
  }
  else
  {
    csd_no = i;
    break;
  }
}
fclose(ifp);

strcpy(&fname[flen], "ccp");
ifp = fopen(fname, "r+");
for (i=0; i<CCP_MAX; i++)
{
  if (fgets(ccp[i].cause1, 80, ifp))
  {
    fgets(ccp[i].cause2, 80, ifp);
  }
  else
  {
    ccp_no = i;
    break;
  }
}
fclose(ifp);

strcpy(&fname[flen], "sym");
ifp = fopen(fname, "r+");
for (i=0; i<SYM_MAX; i++)
{
  if (fgets(sym[i].symptom, 80, ifp))
  {
    for (j=0; j<CND_MAX; j++)
    {
      fgets(sym[i].cond[j], 80, ifp);
      if (sym[i].cond[j][0] == '#')
      {
        sym[i].cond_no = j;
        break;
      }
```

```
        }
        for (j=0; j<PC_MAX; j++)
        {
          fgets(sym[i].pc[j], 80, ifp);
          if (sym[i].pc[j][0] == '#')
          {
            sym[i].pc_no = j;
            break;
          }
          else
            fgets(sym[i].cf[j], 80, ifp);
        }
      }
      else
      {
        sym_no = i;
        break;
      }
    }
  }

update()
{
  char  buffer[80];
  int   count;
  int   parm_cnt;
  int   i, j;

  strcpy(&fname[flen], "com");
  ofp = fopen(fname, "w+");
  fputs("$run shell\n", ofp);
  fputs(pname, ofp);

  /* control strip parameter update */
  strcpy(&fname[flen], "csp");
  ifp = fopen(fname, "w+");
  for (i=0; i<csp_no; i++)
  {
    fputs(csp[i], ofp);
    fputs(csp[i], ifp);
  }
  fclose(ifp);
  fputs("#\n", ofp);

  /* derived parameter update */
  strcpy(&fname[flen], "ddp");
  ifp = fopen(fname, "w+");
  for (i=0; i<ddp_no; i++)
  {
    fputs(ddp[i].name, ofp);
    get_ddp(ddp[i].formula, &parm_cnt);
    for (j=0; j<parm_cnt; j++)
    {
      fputs(ddp_list[j], ofp);
      fputs(parm_sym[j], ofp);
    }
    fputs("#\n", ofp);
    fputs(ddp_opsform, ofp);
    fputs(ddp[i].name, ifp);
    fputs(ddp[i].formula, ifp);
  }
  fclose(ifp);
  fputs("#\n", ofp);

  /* additional data update */
```

```
strcpy(&fname[flen], "add");
ifp = fopen(fname, "w+");
for (i=0; i<add_no; i++)
{
  fputs(add[i].name, ofp);
  fputs(add[i].standard, ofp);
  fputs(add[i].tolerance, ofp);
  fputs(add[i].name, ifp);
  fputs(add[i].standard, ifp);
  fputs(add[i].tolerance, ifp);
}
fclose(ifp);
fputs("#\n", ofp);

/* cause solution description update */
strcpy(&fname[flen], "csd");
ifp = fopen(fname, "w+");
for (i=0; i<csd_no; i++)
{
  fputs(csd[i].cause, ofp);
  fputs(csd[i].rel_data, ofp);
  fputs(csd[i].evidence, ofp);
  fputs(csd[i].solution, ofp);
  fputs("\n", ofp);
  fputs(csd[i].cause, ifp);
  fputs(csd[i].rel_data, ifp);
  fputs(csd[i].evidence, ifp);
  fputs(csd[i].solution, ifp);
}
fclose(ifp);
fputs("#\n", ofp);

/* conflicting cause pair update */
strcpy(&fname[flen], "ccp");
ifp = fopen(fname, "w+");
for (i=0; i<ccp_no; i++)
{
  fputs(ccp[i].cause1, ofp);
  fputs(ccp[i].cause2, ofp);
  fputs(ccp[i].cause1, ifp);
  fputs(ccp[i].cause2, ifp);
}
fclose(ifp);
fputs("#\n", ofp);

/* symptom description update */
strcpy(&fname[flen], "sym");
ifp = fopen(fname, "w+");
for (i=0; i<sym_no; i++)
{
  fputs(sym[i].symptom, ofp);
  fputs(sym[i].symptom, ifp);
  parm_no = sym[i].cond_no;
  aparm_no = 0;
  for (j=0; j<sym[i].cond_no; j++)
  {
    get_cond(sym[i].cond[j], j);
  }
  for (j=0; j<aparm_no; j++)
  {
    fputs(parm_list[parm_no+j], ofp);
    fputs(rel_list[parm_no+j], ofp);
  }
  for (j=0; j<sym[i].cond_no; j++)
  {
```

```
      fputs(parm_list[j], ofp);
      fputs(rel_list[j], ofp);
      fputs(sym[i].cond[j], ifp);
    }
    fputs("#\n", ofp);
    fputs("#\n", ifp);
    for (j=0; j<sym[i].pc_no; j++)
    {
      fputs(sym[i].pc[j], ofp);
      fputs(sym[i].cf[j], ofp);
      fputs(sym[i].pc[j], ifp);
      fputs(sym[i].cf[j], ifp);
    }
    fputs("#\n", ofp);
    fputs("#\n", ifp);
  }
  fclose(ifp);
  fputs("#\n", ofp);

  fputs("$exit\n", ofp);
  fclose(ofp);
}

get_cmnd(cmnd, f_type, f_num)
char*   cmnd;
int*    f_type;
int*    f_num;
{
  char  input[80];
  int   i;

  getline(input);
  *cmnd = input[0];
  if (*cmnd != 'a' && *cmnd != 'd' && *cmnd != 'l' && *cmnd != 'm')
    return;

  *f_type = -1;          /* error */
  if (strncmp (&input[1], " csp", 4) == 0)
    *f_type = CSP;
  if (strncmp (&input[1], " ddp", 4) == 0)
    *f_type = DDP;
  if (strncmp (&input[1], " add", 4) == 0)
    *f_type = ADD;
  if (strncmp (&input[1], " csd", 4) == 0)
    *f_type = CSD;
  if (strncmp (&input[1], " ccp", 4) == 0)
    *f_type = CCP;
  if (strncmp (&input[1], " sym", 4) == 0)
    *f_type = SYM;
  if (*f_type != -1)
  {
    *f_num = 0;
    *f_num = atoi(&input[5]);
  }
}

get_ddp(form, parm_cnt)
char    form[];
int*    parm_cnt;
{
  int   parm_ptr;
  int   form_ptr;
  int   opsform_ptr;
  int   ddp_no;
```

```
  form_ptr = 0;
  opsform_ptr = 8;
  ddp_no = 0;
/*
  while (isalpha(form[form_ptr]))
    ddp_opsform[opsform_ptr++] = form[form_ptr++];
*/
  for (;;)
  {
    if (isalpha(form[form_ptr]))
    {
      parm_ptr = 0;
      while (form[form_ptr] != ' ')
      {
        ddp_list[ddp_no][parm_ptr++] = form[form_ptr++];
      }
      ddp_list[ddp_no][parm_ptr] = '\n';
      strcpy (&ddp_opsform[opsform_ptr], parm_sym[ddp_no++]);
      opsform_ptr += 4;
    }
    else
    {
      if (form[form_ptr] == '/')
        ddp_opsform[opsform_ptr++] = '/';
      ddp_opsform[opsform_ptr++] = form[form_ptr];
      if (form[form_ptr++] == '\n')
      {
        *parm_cnt = ddp_no;
        return;
      }
    }
  }
}

get_cond(cond, num)
char    cond[];
int     num;
{
  int   parm_ptr;
  int'  cond_ptr;
  int   rel_ptr;
  int   i;

  parm_ptr = 0;
  cond_ptr = 0;
  rel_ptr = 4;

  strcpy(rel_list[num], parm_sym[num]);
  while (cond[cond_ptr] != ' ' && cond[cond_ptr] != '\n')
    parm_list[num][parm_ptr++] = cond[cond_ptr++];
  parm_list[num][parm_ptr++] = '\n';
  parm_list[num][parm_ptr] = '\0';
  if (cond[cond_ptr] == '\n')
    return;

  while (cond[cond_ptr] != '\n')
  {
    if (isalpha(cond[cond_ptr]))
      break;
    else
      rel_list[num][rel_ptr++] = cond[cond_ptr++];
  }
  if (cond[cond_ptr] == '\n')
  {
```

```
  rel_list[num][rel_ptr++] = '\n';
  rel_list[num][rel_ptr] = '\0';
  return;
 }

 for (i=0; i<num; i++)
 {
  if (strcmp(&cond[cond_ptr], parm_list[i]) == 0)
  {
    strcpy(&rel_list[num][rel_ptr], parm_sym[i]);
    return;
  }
 }

 for (i=0; i<aparm_no; i++)
 {
  if (strcmp(&cond[cond_ptr], parm_list[parm_no+i]) == 0)
  {
    strcpy(&rel_list[num][rel_ptr], parm_sym[parm_no+i]);
    return;
  }
 }

 strcpy(rel_list[parm_no+aparm_no], parm_sym[parm_no+aparm_no]);
 strcpy(parm_list[parm_no+aparm_no], &cond[cond_ptr]);
 strcpy(&rel_list[num][rel_ptr], parm_sym[parm_no+aparm_no]);
 aparm_no++;
 return;
}

getline(buffer)
char buffer[];
{
 int   i;

 for (i=0; i<80; i++)
 {
  buffer[i] = getchar();
  if (buffer[i] == '\n')
  {
    buffer[i+1] = '\0';
    break;
  }
 }
 }
```

Data Definition Module

```
(vector-attribute id)
(vector-attribute parm)
(vector-attribute soln)

(literalize csp
        seq_no
        id
        val
)

(literalize ad_data
        id
        seq_no
        std
```

```
        tol
        val
)

(literalize context
        state
        seq_no
        parm
)

(literalize symptom
        id
        sym_code
)

(literalize cause
        cause_code
        ad_flag
        sym_code
        cf
)

(literalize cause_soln
        cause_id
        cause_code
        rel_data
        evidence
        soln
)

(literalize cause_pair
        cause_code1
        cause_code2
)
```

Utility Routine to Supplement User Input

```
        integer function getline
        include 'opsdef.for'
        character*80 string
        character sstring(80)
        equivalence (string, sstring(1))
        integer i, atom
        accept 100, string
100     format (A80)
        i = 80
        do 200 while (sstring(i) .EQ. ' ')
          i = i - 1
200     end do
        if (i .EQ. 0) then
          sstring(1) = '!'
        end if
        if ((sstring(1) .EQ. '#') .or. (sstring(1) .EQ. '!')) then
          i = 1
        end if
        atom = ops$intern (%ref(sstring(1)), %val(i))
        call ops$value (%val(atom))
        end
!
        integer function getaccept
        include 'opsdef.for'
        character*80 string
```

```
      character sstring(80)
      equivalence (string, sstring(1))
      integer i, ptr, n, atom
      logical wordflag
      accept 100, string
100   format (A80)
      wordflag = .FALSE.
      do 200 i = 1, 80
        if (.not. wordflag) then
          if (sstring(i) .NE. ' ') then
            n = 1
            ptr = i
            wordflag = .true.
          end if
        else
          if (sstring(i) .NE. ' ') then
            n = n + 1
          else
            wordflag = .false.
            atom = ops$intern (%ref(sstring(ptr)), %val(n))
            call ops$value (%val(atom))
          end if
        end if
200   end do
      end
!
      integer function cal_cf (acf, astd, atol, aval, aev)
      include 'opsdef.for'
      integer acf, astd, atol, aval, aev
      integer cf
      real std, tol, val
      character*4 ev
      real fcf, diff, percent
      integer ncf, atom, len
      cf = ops$cvan (%val(%loc(acf)))
      std = ops$cvaf (%val(%loc(astd)))
      tol = ops$cvaf (%val(%loc(atol)))
      val = ops$cvaf (%val(%loc(aval)))
      len = ops$pname (%val(%loc(aev)), %ref(ev), %val(4))
      if ((ev(1:1) .EQ. 'h') .or. (ev(1:1) .EQ. 'H')) then
        diff = val - std
      else
        diff = std - val
      end if
      fcf = float(cf) / 100.0
      if (diff .le. 0.0) then
        fcf = 0
      else if (diff .le. tol) then
        fcf = fcf * diff / tol
      else if (.true.) then
        fcf = 1.0 - (1.0 - fcf) * tol / diff
      end if
      ncf = ifix(fcf*100.0)
      atom = ops$cvna (%val(ncf))
      call ops$value (%val(atom))
      end
!
      integer function spread (sp1, sp2, sp3)
      include 'opsdef.for'
      integer sp1, sp2, sp3
      integer p(3)
      integer max, min, sprd, atom
```

```
        p(1) = ops$cvan (%val(%loc(sp1)))
        p(2) = ops$cvan (%val(%loc(sp2)))
        p(3) = ops$cvan (%val(%loc(sp3)))
        max = p(1)
        min = p(2)
        do 200 i = 2, 3
          if (p(i) .gt. max) then
            max = p(i)
          else if (p(i) .lt. min) then
            min = p(i)
          end if
200     end do
        sprd = max - min
        atom = ops$cvna (%val(sprd))
        call ops$value (%val(atom))
        end
```

What is claimed is:

1. A knowledge engineering tool for use by an expert system user in conjunction with a photofinishing process incorporating a control strip for providing diagnostic information concerning said process, said tool comprising:

(a) a target expert system;

(b) means for inputting into said target expert system target data obtained from analysis of said control strip used in said photofinishing process for allowing said target expert system to look for any deviations from the norm in said target data;

(c) a target knowledge base module;

(d) means for inputting into said target knowledge base module additional data relating to said photofinishing process;

(e) a data definition module;

(f) means for inputting into said data definition module structural knowledge relating to a photofinishing process;

(g) an expert system skeleton module that contains structural knowledge along with requested data from said target knowledge base module and structural knowledge existing within said data definition module to provide a list of symptoms characterizing said process to the expert system user;

(h) means for generating a first list of possible causes of any deviation from normal and an indication of the occurrance of said causes based upon the system characterization of this particular process; and (i) means for generating a second list of prescriptions for alleviating each of the possible causes in said first list.

2. A knowledge engineering tool including a computer to be used diagnostically to monitor and control a photofinishing process incorporating a control strip for providing diagnostic information concerning said process, said tool comprising:

(a) means for analyzing said control strip used in said photofinishing process to obtain densitometric information concerning said process and for automatically transferring said information obtained from said control strip into said knowledge engineering tool;

(b) means for comparing said densitometric information with reference readings previously stored in said computer to generate a list of symptoms from deviations between said densitometric information and said reference readings;

(c) means for assigning to each symptom a certainty factor proportional to the deviation of the symptom from a norm established by the average value expected to occur in said process;

(d) means for forward chaining to generate a list of possible causes of the symptoms identified by said certainty factor means;

(e) means for assigning attenuation factors associated with respective possible causes;

(f) means for combining a certainty factor of a derived symptom with an attenuation factor of a possible cause associated with that derived symptom;

(g) means for merging possible causes where said certainty factor means concludes that the same cause description may be generated from two or more different symptoms;

(h) means for prompting the gathering of additional data that may confirm or disconfirm the association between a symptom and its possible causes identified by said certainty factor means;

(i) means for generating a modification factor based on the possible cause and tolerance range of any additional data received; and (j) means for generating a list of possible causes along with certainty factors associated with each of said causes.

3. A knowledge engineering tool for use by an expert system user comprising a computer having memory for storing information relating to a photofinishing process and a knowledge base memory for storing predetermined instructions relating to the determination of possible causes of symptoms present in said photofinishing process, said tool comprising:

(a) means for modifying and editing the information relating to said photofinishing process;

(b) means for analyzing a control strip used in said photofinishing process to obtain densitometric information;

(c) means for interpreting said knowledge base to run an interactive consultation with the user;

(d) means for establishing out of tolerance parameters;

(e) means for including in said knowledge base, facts relating to densitometric tolerances for a given photofinishing process for generating a list of symptoms based on said out of tolerance parameters and for assigning certainty factors based on the deviation of each symptom from the norm in said target data;

(f) means for including in said knowledge base rules including premises having logical operations to generate possible causes for each symptom;

(g) means for including in said knowledge base information obtained from troubleshooting experts for deriving an attenuation factor for each of the possible causes;

(h) means for combining the certainty factor of said symptom with the derived attenuation factor for said possible causes;

(i) means for merging possible causes where said cause description may be generated from two or more different symptoms;

(j) means for prompting additional data as deemed relevant by the knowledge base rules;

(k) means for generating a modification factor based on the possible cause and tolerance level of any additional data received;

(l) means for generating a first list of possible causes along with certainty factors of said causes; and (m) means for generating a second list of prescriptions for alleviating each of the possible causes first listed.

4. An expert system tool for use by an expert system user in conjunction with the control of a given photofinishing process comprising:

a computer having a stored program and memory for storing a knowledge base related to one or more photofinishing processes;

a control strip used in said photofinishing process to supply densitometric information;

means for including in said knowledge base factual knowledge and judgmental knowledge concerning the photofinishing process, said judgmental knowledge including judgmental rules;

means for using said factual knowledge including definitions of densitometric parameters associated with a given photofinishing process;

means for using said judgmental rules including rules having premises referring to causes for out of tolerance densitometric parameters and rules for concluding which parameters were out of tolerance;

means for executing a built-in control procedure including:

means for determining possible causes for said out of tolerance parameters based on the knowledge base for a specific photofinishing process;

means for invoking and chaining said rules associated with a specific photofinishing process;

means for using judgmental knowledge derived from experts to generate an attenuation factor associated with all possible causes for said out of tolerance parameter;

means for merging possible causes where said cause description may be generated from more than one cause for a given out of tolerance parameter;

means for generating a modification factor based on possible cause and deviation from the normal range of additional data received from a request for more data; and means for generating a list of possible causes along with certainty factors associated with each of said causes.

* * * * *